(12) United States Patent
Kikuchi et al.

(10) Patent No.: US 6,202,078 B1
(45) Date of Patent: Mar. 13, 2001

(54) ARITHMETIC CIRCUIT USING A BOOTH ALGORITHM

(75) Inventors: Haruhide Kikuchi; Masayuki Koizumi, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/177,558

(22) Filed: Oct. 23, 1998

(30) Foreign Application Priority Data

Oct. 29, 1997 (JP) .................................................. 9-297386

(51) Int. Cl.[7] ...................................................... G06F 7/52
(52) U.S. Cl. ............................................ 708/628; 708/626
(58) Field of Search .................................... 708/620, 622, 708/623, 624, 625, 626, 627, 628, 629, 630, 631, 632, 500, 408

(56) References Cited

U.S. PATENT DOCUMENTS

| 5,053,987 | * | 10/1991 | Genusov et al. | 708/500 |
| 5,095,456 | * | 3/1992 | Wong | 708/625 |
| 5,163,017 | * | 11/1992 | Wong et al. | 708/408 |
| 5,179,530 | * | 1/1993 | Genusov et al. | 708/408 |
| 5,426,599 | * | 6/1995 | Machida | 708/628 |
| 5,521,856 | * | 5/1996 | Shiraishi | 708/628 |
| 5,600,658 | * | 2/1997 | Qureshi | 371/22.1 |
| 5,684,730 | * | 11/1997 | Martinez et al. | 708/625 |
| 5,751,618 | * | 5/1998 | Abiko et al. | 708/500 |

* cited by examiner

Primary Examiner—Thomas C. Lee
Assistant Examiner—Rijue Mai
(74) Attorney, Agent, or Firm—Oblon, Spivak, McClelland, Maier & Neustadt, P.C.

(57) ABSTRACT

A booth decoder decodes A or −A according to a booth algorithm, depending upon whether A×B or −A×B should be multiplied. A partial multiplier/partial adder circuit 30 generates partial products of A×B or −A×B following to a result of the decoding, and sequentially adds these partial products. Data C, or data made by inverting bits of C, is input to the partial multiplier/partial adder circuit 30, depending upon whether C should be added or −C should be added to the result of multiplication. Also the data C or data made by inverting bits of C are sequentially added by the partial multiplier/partial adder circuit 30. A final adder circuit 50 executes final addition of these partial products, and adds 1 when −C should be added. Thus, $Z=\pm(A\times B)\pm C$ (the order of signs being variable) can be calculated.

34 Claims, 27 Drawing Sheets

ARITHMETIC CIRCUIT USING A BOOTH ALGORITHM

BACKGROUND OF THE INVENTION

1. Field of the Invention

This invention relates to a multiplier/adder/subtracter and a digital signal processor using it, which use, for example, booth algorithm.

2. Description of the Prior Art

FIG. 27 is a diagram showing a prior art multiplier/adder/subtracter for computing Z=±(A×B)±C (the order of signs being variable). A, B, C and Z represent binary data expressed by complements of 2, respectively.

As shown in FIG. 27, a multiplier A is input into a booth decoder circuit 1. The multiplier A is decoded in the booth decoder circuit 1 according to a booth algorithm. The decoded result is input to a partial multiplier/partial adder circuit 2 which is also supplied with a multiplicand B to generate partial products and accumulate partial products having the same significance by using the booth algorithm from the multiplier A and the multiplicand B. The partial multiplier/partial adder circuit 2, however, executes only a part of addition of generated partial products. More specifically, it progresses addition of partial products of respective steps by CSA (carry save adder system) except for addition of the final step. The result of the addition is input to a multiplier final adder circuit 3.

The multiplier final adder circuit 3 conducts final addition of these partial products. That is, it executes addition of the final step among addition of partial products. For addition of the final step, CLA (carry look ahead adder system), ripple carry system serially connecting all adders, or the like, is used because consideration must be made also on carry from lower positions. It results in all partial products having the same significance having been added in the multiplier final adder circuit 3, and data as a result of A×B computation is output.

Data resulting from A×B computation is input to a code inverter circuit 4. The code inverter circuit 4 inverts the sign of A×B in response to a control signal 1. That is, depending upon the value of the control signal, it outputs A×B in its original form, or outputs −(A×B) by inverting the sign of A×B. The output is input to an adder 5.

On the other hand, an addend C is input into a code inverter circuit 6. The code inverter circuit 6 inverts the sign of the addend C in response to a control signal 2. That is, depending upon the value of the control signal 2, it outputs C in its original form, or output −C by inverting the sign of C. Also this output is input to the adder 5.

The adder 5 executes addition of input data from the code inverter circuits 4 and 6. That is, it conducts addition of data ±(A×B) and data ±C by CLA, for example, and outputs Z as a result of final calculation.

It will be understood from the foregoing explanation that, for calculating Z=±(A×B)±C (the order of signs being variable) in this manner, ±(A×B) must be first calculated before calculating ±C. Therefore, the prior art needs the multiplier final adder circuit 3 and the adder 5 which are the same in function. The multiplier final adder circuit 3 and the adder 5 are normally designed for CLA as mentioned above, and therefore large in circuit scale. Therefore, it was the problem that these two circuits, multiplier final adder circuit 3 and adder 5, increased the entire circuit area. It was another problem that the number of gate steps contained in the critical path increased and inevitably decreased the calculation speed. The critical path pertains to the path taking the longest time for propagation of a signal between the input terminal and the output terminal. Therefore, the use of two circuits equivalent in function gave no advantage for the calculation speed.

SUMMARY OF THE INVENTION

It is therefore an object of the invention to provide a multiplier/adder/subtracter not requiring two functionally equivalent circuits. More specifically, it is intended to provide a multiplier/adder/subtracter which can omit the adder 5 from the multiplier final adder circuit 3 and the adder 5. A further object of the invention is to provide a multiplier/adder/subtracter reduced in circuit area and improved in calculation speed.

According to the invention, there is provided a multiplier/adder/subtracter for calculation of Z=±(A×B)±C (the order of signs being variable) for Z, A, B and C as complement data of 2 by using a booth algorithm, comprising:

booth decode execution means changed to decode A in the original form or to decode −A by changing a first control signal depending upon whether A×B or −A×B should be calculated by multiplication;

sign-attached partial product generating means supplied with a result of decoding by the booth decode execution means and B to generate partial products thereof; and sign-attached adder means for adding partial products generated by the sign-attached partial product generating means, and for adding C as a part of addition of said partial products when C is added to a result of multiplication or adding −C as a part of addition of the partial products when C is subtracted from the result of multiplication.

There is further provided a multiplier/adder/subtracter for calculation of Z=±(A×B)±C (the order of signs being variable) for Z, A, B and C as binary data, comprising:

sign-attached partial product generating means for generating partial products of A×B when multiplication of A×B should be done and for generating partial products of −A×B when multiplication of −A×B should be done; and sign-attached adder means for executing addition of partial products generated by said sign-attached partial product generating means and for adding C as a part of addition of said partial products when C should be added to the result of multiplication or adding −C as a part of addition of the partial products when C should be subtracted from the result of multiplication.

There is further provided a digital signal processor having a multiplier/adder/subtracter for calculation of Z=±(A×B)±C (the order of signs being variable) for Z, A, B and C as complement data of 2 by using a booth algorithm, the multiplier/adder/subtracter comprising:

booth decode execution means changed to decode A in the original form or to decode −A by changing a first control signal depending upon whether A×B or −A×B should be calculated by multiplication;

sign-attached partial product generating means supplied with a result of decoding by the booth decode execution means and B to generate partial products thereof; and sign-attached adder means for adding partial products generated by the sign-attached partial product generating means, and for adding C as a part of addition of said partial products when C is added to a result of multiplication or adding −C as a part of addition of the partial products when C is subtracted from the result of multiplication.

DETAILED DESCRIPTION OF THE PREFERRED EMBODIMENTS

The invention intends to decrease the circuit scale and increase the calculation speed of a multiplier/adder/subtracter for calculating $Z=\pm(A\times B)\pm C$ (the order of signs being variable) by commonly using a circuit for adding partial products generated by multiplication and a circuit for adding an addend to the result of the multiplication. An embodiment of the invention is explained below in detail with reference to the drawings.

Figure 1:
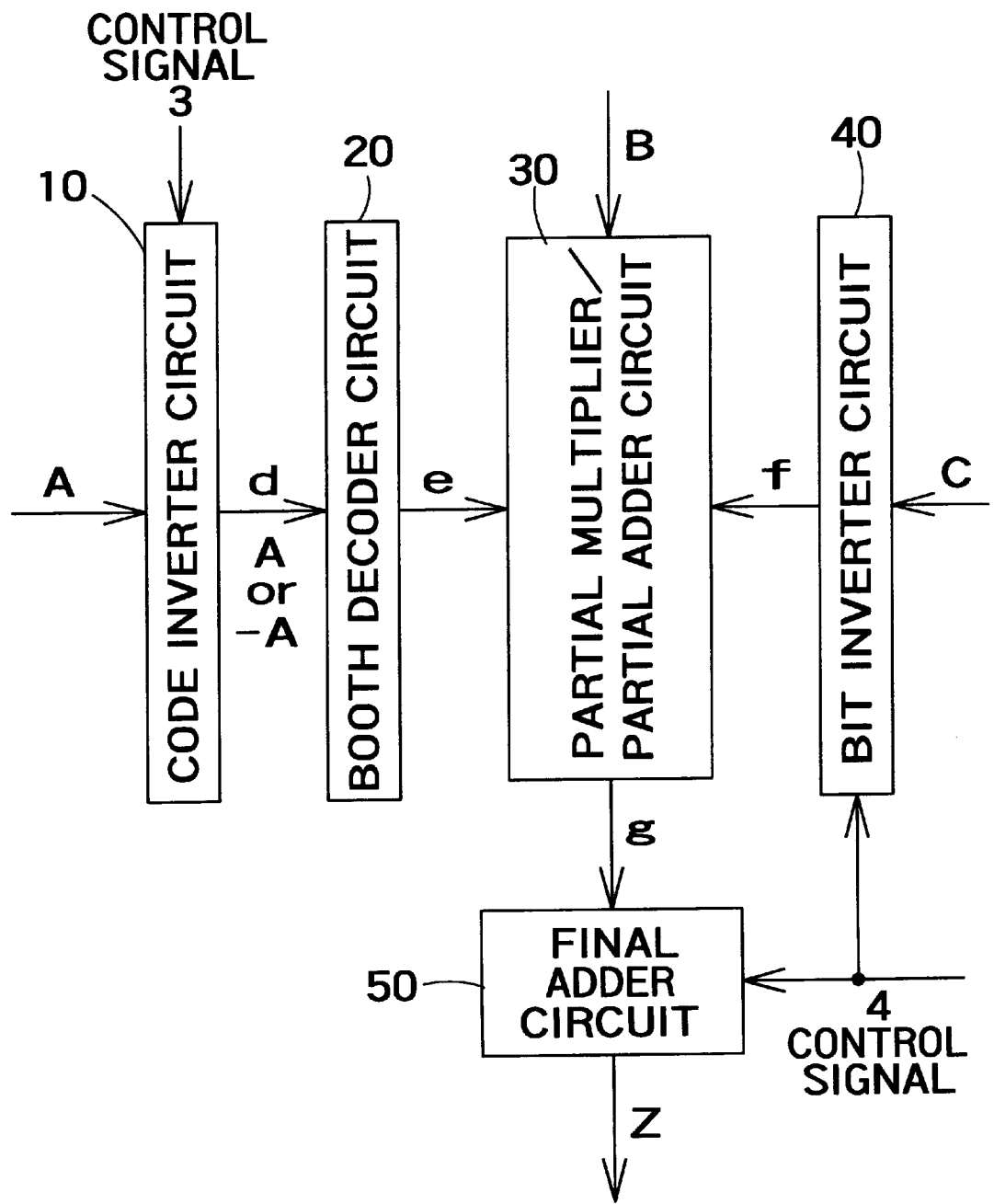
FIG. 1 is a block diagram of a multiplier/adder/subtracter according to an embodiment of the invention.

FIG. 1 is a diagram showing a multiplier/adder/subtracter taken as an embodiment. The multiplier/adder/subtracter is an operator for calculating $Z=\pm(A\times B)\pm C$ (the order of signs being variable) by utilizing a booth algorithm. Each of A, B, C and Z is binary data expressed by complements of 2. The order of signs being variable means that there are four patterns of calculation, $+(A\times B)+C$, $+(A\times B)-C$, $-(A\times B)+C$ and $-(A\times B)-C$.

As shown in FIG. 1, a multiplier A is input into a code inverter circuit 10 of the multiplier/adder/subtracter, which is illustrated in a left side. The code inverter circuit 10 selectively inverts the sign of the multiplier A, depending on a control signal 3. That is, depending on the value of the control signal 3, it outputs A as data d, or outputs −A as data d by inverting the sign of A. Inversion of the sign of A in expression by complements of 2 means inverting each bit of A and adding 1 to the least significant bit. By selecting A or −A as the output in this manner, it results in selecting one of A×B and −(A×B) as multiplication to be executed. That is, A×B or −(A×B) can be selected depending on the control signal 3. The data d is input to a booth decoder circuit 20.

The booth decoder circuit 20 decodes the data d, namely, A or −A according to a secondary booth algorithm. More specifically, when (A×B) should be done as multiplication, the multiplier A is decoded directly. When −(A×B) should be done as multiplication, −A inverted in sign from the multiplier A is decoded. The decoded result in the booth decoder circuit 20 is input as a signal e to a partial multiplier/partial adder circuit 30. The signal e is instruction from the booth decoder circuit 20 to the partial multiplier/partial adder circuit 30 to multiply by +1, −1, +2, −2 or 0.

A bit inverter circuit 40 illustrated on a right side of FIG. 1 is supplied with an addend C. The bit inverter circuit 40 selectively performs bit inversion in accordance with a control signal 4. That is, depending on the value of the control signal 4, it outputs the addend C as data f, or by inverting the bit of the addend C. By the bit inversion and addition of 1 to the least significant bit which will be explained later, it is selected whether C is added or −C is added. That is, the control signal 4 determines whether C is added or subtracted. Also the data f is input to the partial multiplier/partial adder circuit 30.

Also a multiplicand B is input to the partial multiplier/partial adder circuit 30. Therefore, the partial multiplier/partial adder circuit 30 produces partial products of the multiplier A and the multiplicand B according to the signal e as the decoded result, and progresses partial addition of the partial products. That is, it sequentially generates partial products of the multiplier A and the multiplicand B by CSA, and sequentially adds partial products having the same significance. However, the partial multiplier/partial adder circuit 30 conducts a part of addition of the partial products. That is, it executes addition of respective steps except for addition of the final step while progressing addition by CSA. In a part of the adding process, also the binary data f is added. That is, the binary data f input from the bit inverter circuit 40 is also added to a partial product having the same significance in the partial multiplier/partial adder circuit 30. The result of addition in the intermediate step is input as binary data g to a final adder circuit 50.

The final adder circuit 50 executes addition of the final step in the adding process of the partial products. That is, in addition of the final step by the CSA system, addition of a carry cannot be added in a next step, and a carry from the final step must be added in the final step. Therefore, addition of the final step must rely on the ripple carry adder system or CLA system. In the embodiment shown here, addition by CLA is employed to increase the speed of operation. Also a control signal 4 is input to the final adder circuit 50. According to the control signal 4, the final adder circuit 50 adds 1 to the least significant bit when the addend C is inverted. That is, when the addend C is bit-inverted in the bit inverter circuit 50, 1 is added. It results in adding −C to the result of multiplication. That is, by inverting the bit in the bit inverter circuit 40 and adding 1 to the least significant bit in the final adder circuit 50, −C can be expressed by complements of 2. Thus, a final result of operation, Z, can be obtained. That is, the result Z of operation of ±(A×B)±C (the order of signs being variable) can be obtained.

Figure 2:
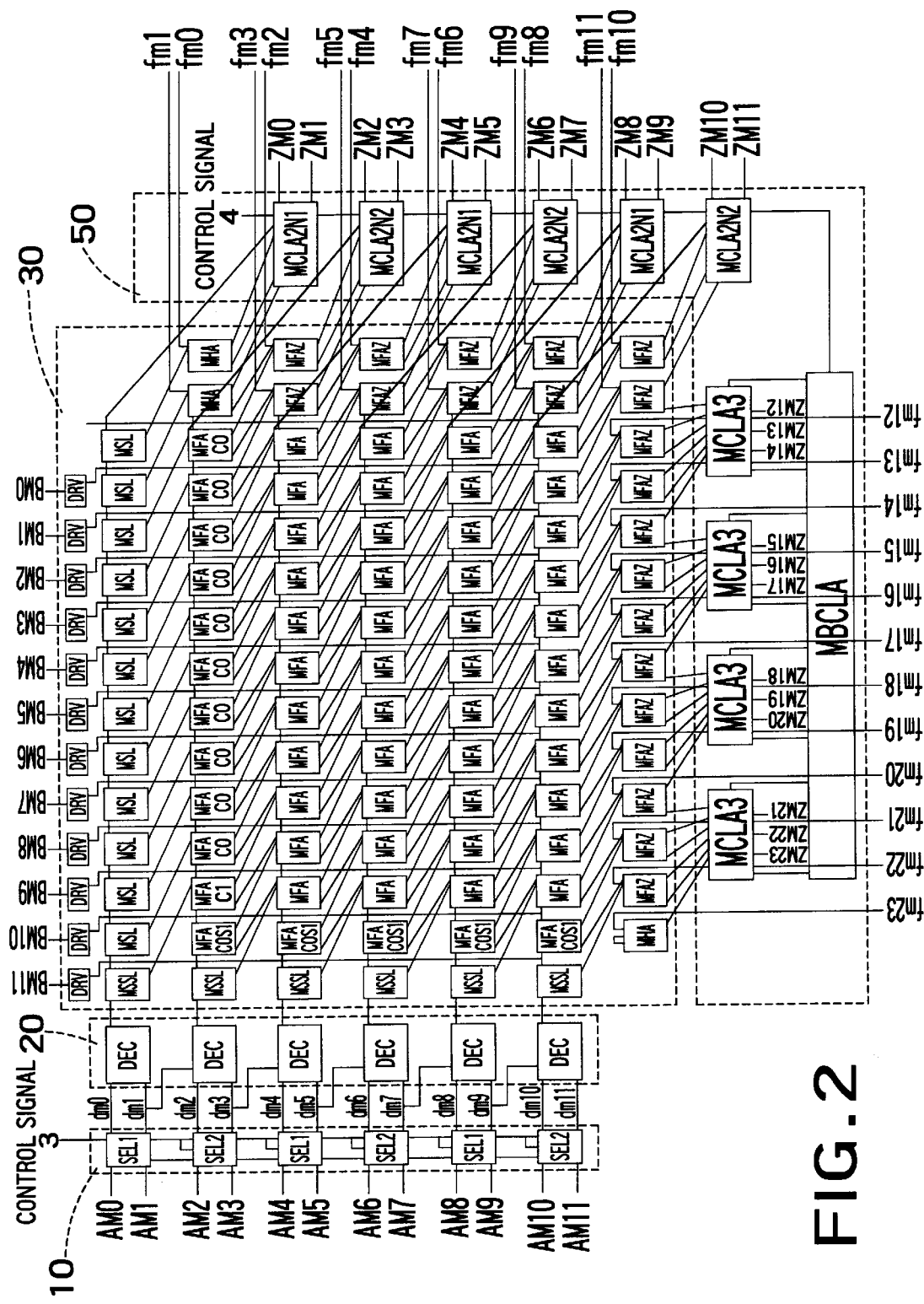
FIG. 2 is a circuit diagram of a central part of the multiplier/adder/subtracter according to an embodiment of the invention.

FIG. 2 is a diagram showing an exemplary arrangement of the multiplier/adder/subtracter shown in FIG. 1.

Figure 3:
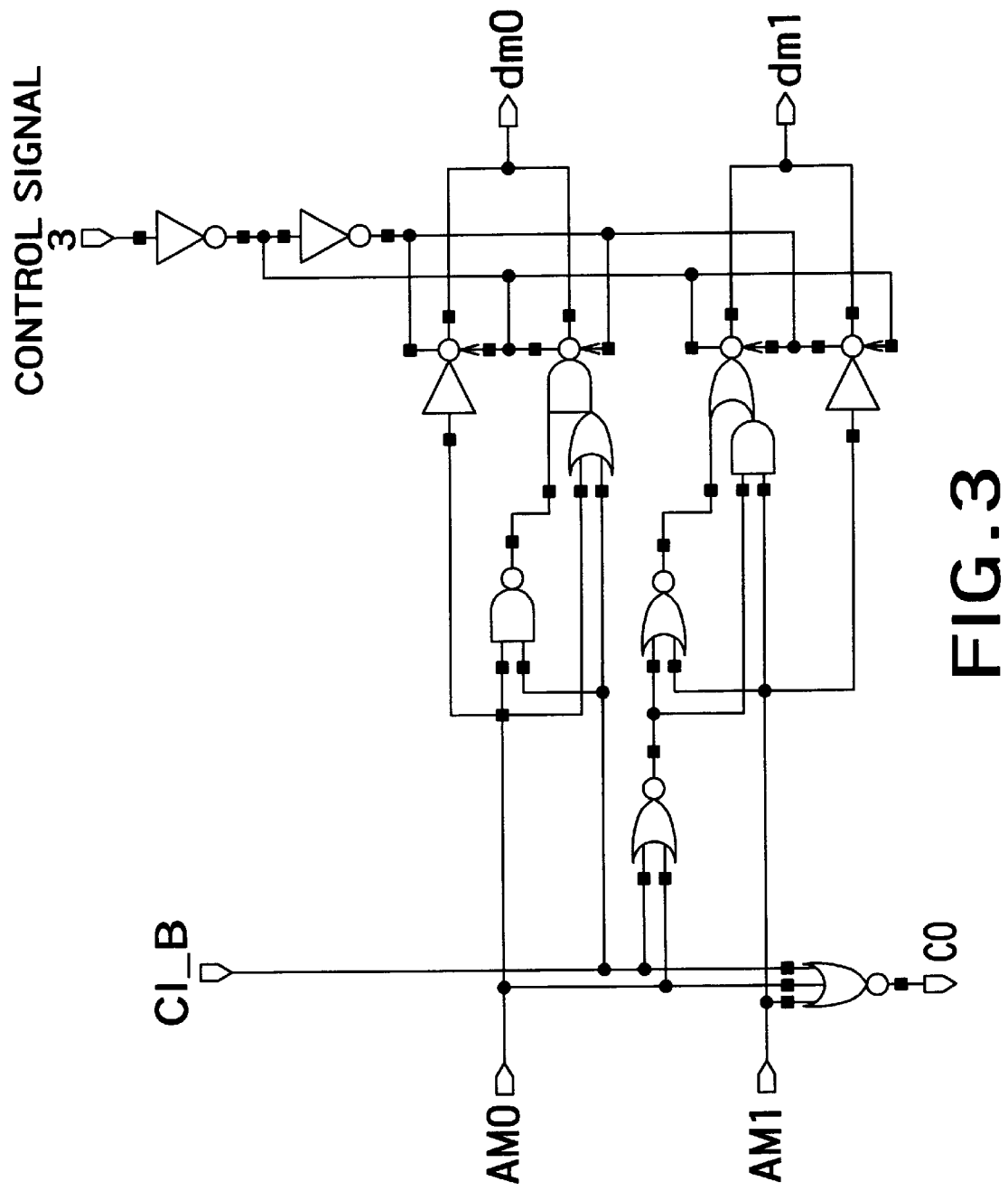
FIG. 3 is a diagram showing an exemplary circuit arrangement of a selector circuit SEL1 used in FIG. 2.
Figure 4:
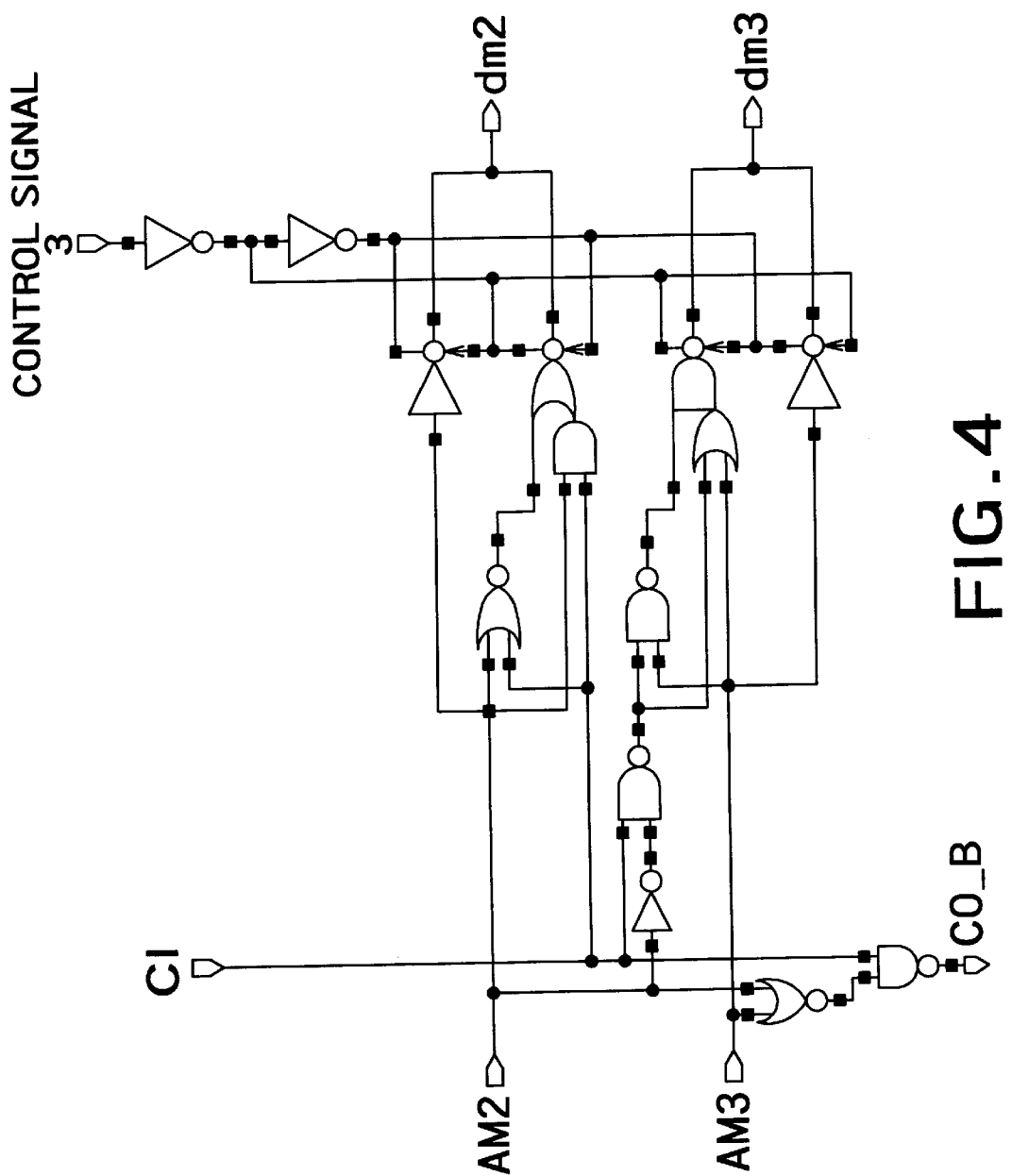
FIG. 4 is a diagram showing an exemplary circuit arrangement of a selector circuit SEL2 used in FIG. 2.

As shown in FIG. 2, the code inverter circuit 10 explained above is provided on a left side of the drawing. The code inverter circuit 10 includes a plurality of selector circuits SEL1 and SEL2 which are supplied with the multiplier A and the control signal 3. In the embodiment shown here, the multiplier A is data of 12 bits AM0 to AM11 expressed by complements of 2. The code inverter circuit 10 outputs data d of 12 bits, dm0 through dm11. As explained above, the data d represents A or −A depending upon the value of the control signal 3. An exemplary circuit arrangement of the selector circuit SEL1 used in the code inverter circuit 10 is shown in FIG. 3, and an exemplary circuit arrangement of the selector circuit SEL2 is shown in FIG. 4. The selector circuits SEL1 and SEL2 are located alternately so that CO of a selector circuit SEL1 to CO_B propagate through a step of gate and CO_B of a selector circuit SEL2 to CO of a selector circuit SEL1 propagate through a step of gate. In this manner, it is prevented that the path decreases the speed.

Figure 5:
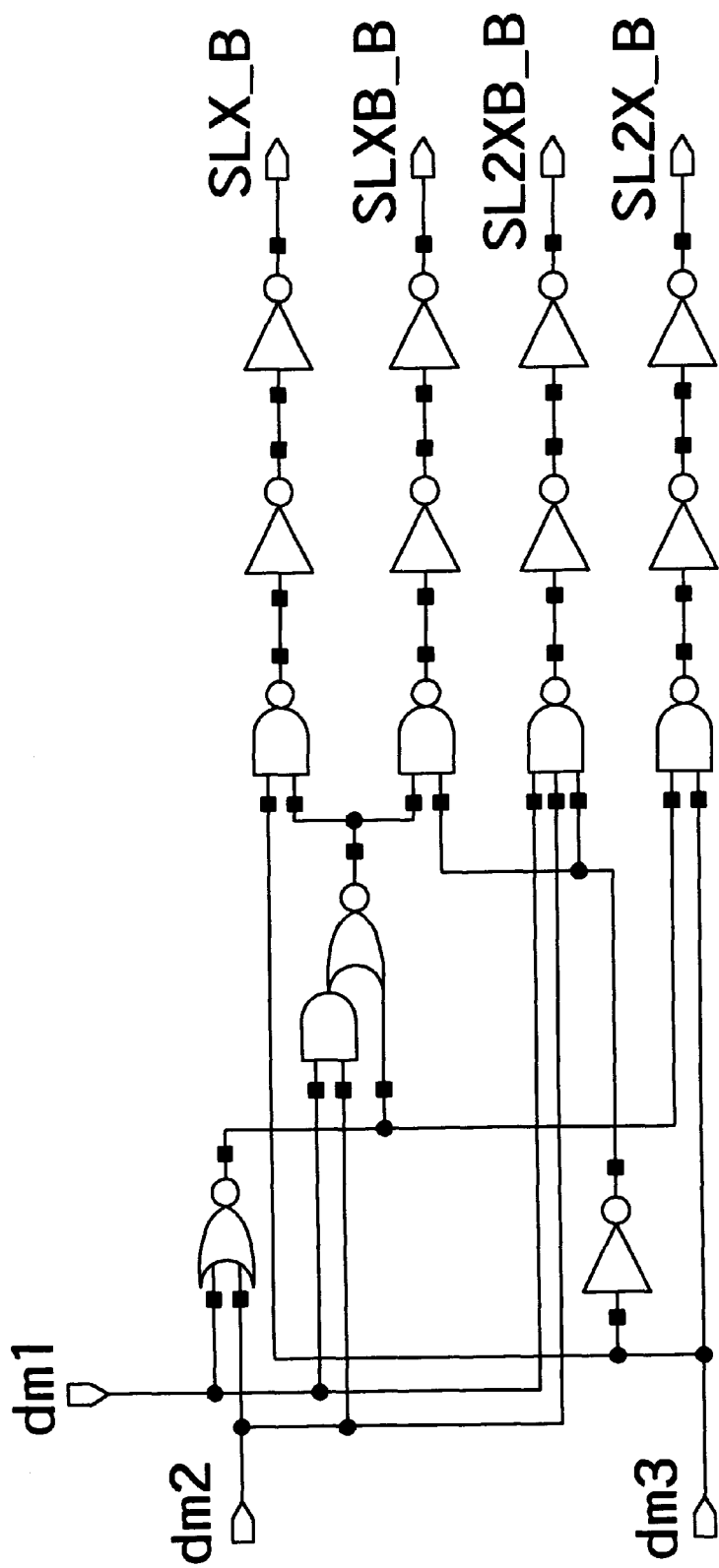
FIG. 5 is a diagram showing an exemplary circuit arrangement of a decoder circuit DEC used in FIG. 2.

As shown in FIG. 2, the booth decoder circuit 20 is made up of a plurality of decoder circuits DEC. Each decoder circuit DEC is supplied with data of 3 bits among the data of 12 bits, dm0 through dm11. Therefore, adjacent decoder circuits DEC are supplied with common one bit of them. An exemplary circuit arrangement of the decoder circuit DEC is shown in FIG. 5. The decoder circuit DEC shown in FIG. 5 generates a signal e of four bits from data of three bits. That is, it generates SLX_B, SLXB B, SL2XB_B and SL2X_B. These signals indicate whether corresponding partial products should be multiplied by 1, −1, 2 or −2. If none of four bits of the signal e rises, it means that the partial product should be zero. Therefore, according to the instruction, the partial multiplier/partial adder circuit 30 generates partial products.

Figure 6:
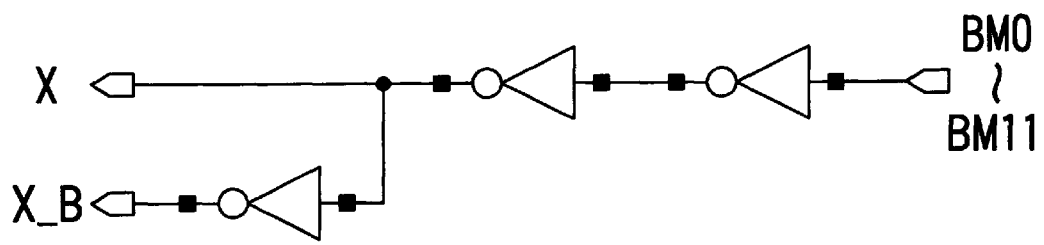
FIG. 6 is a diagram showing an exemplary circuit arrangement of a drive circuit DRV used in FIG. 2.
Figure 7:
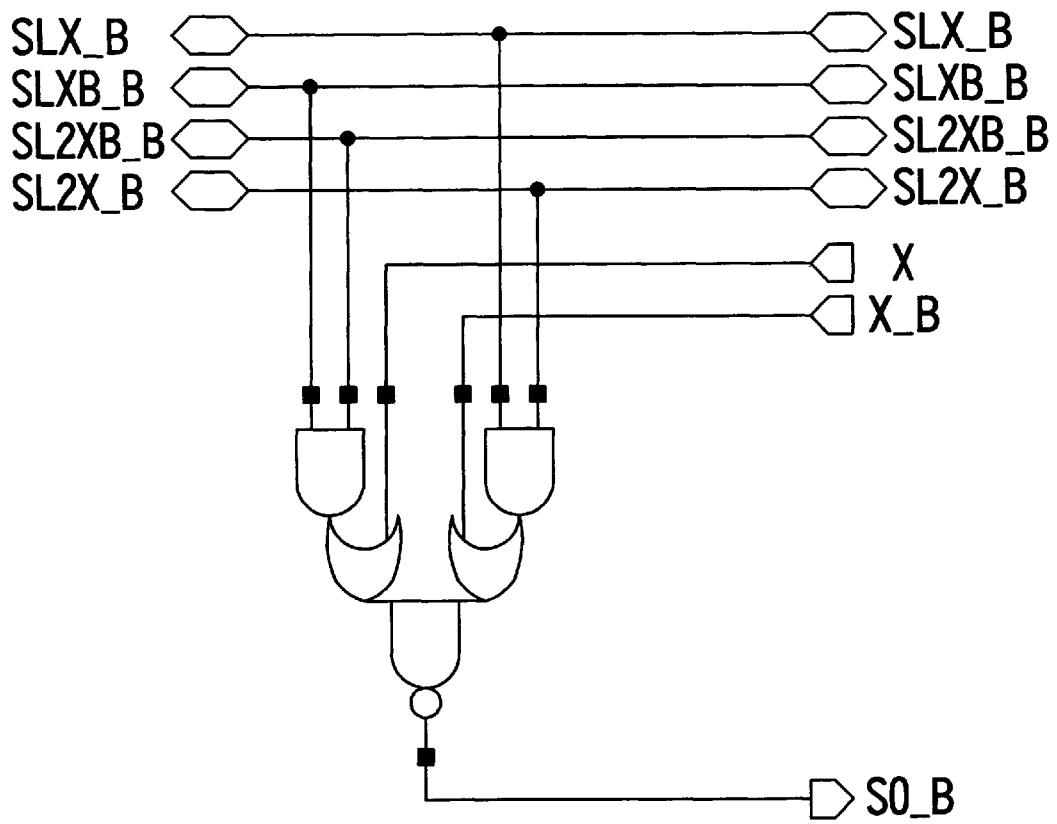
FIG. 7 is a diagram showing an exemplary circuit arrangement of a code extension selector circuit MSSL used in FIG. 2.
Figure 8:
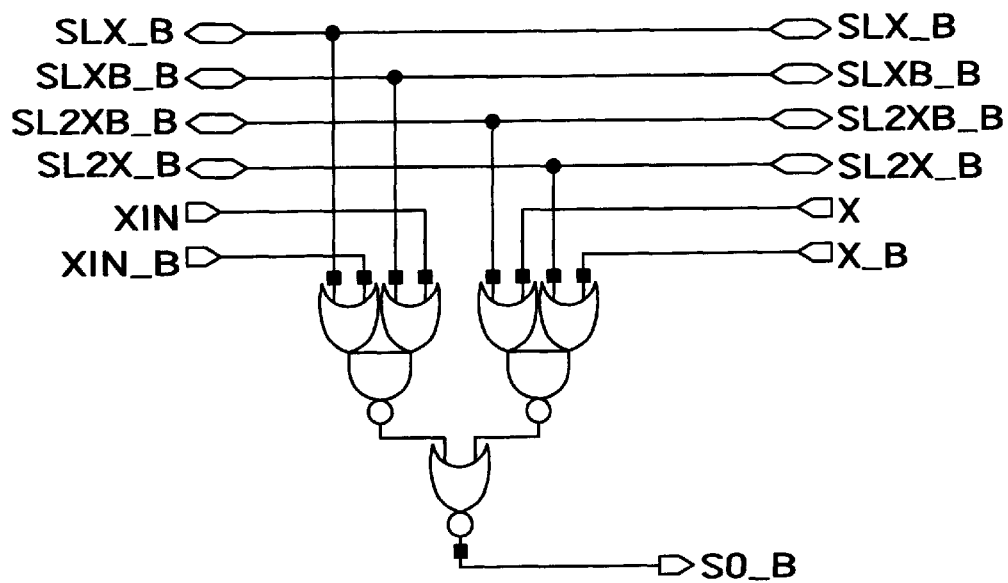
FIG. 8 is a diagram showing an exemplary circuit arrangement of a partial multiplication selector circuit MSL used in FIG. 2.
Figure 9:
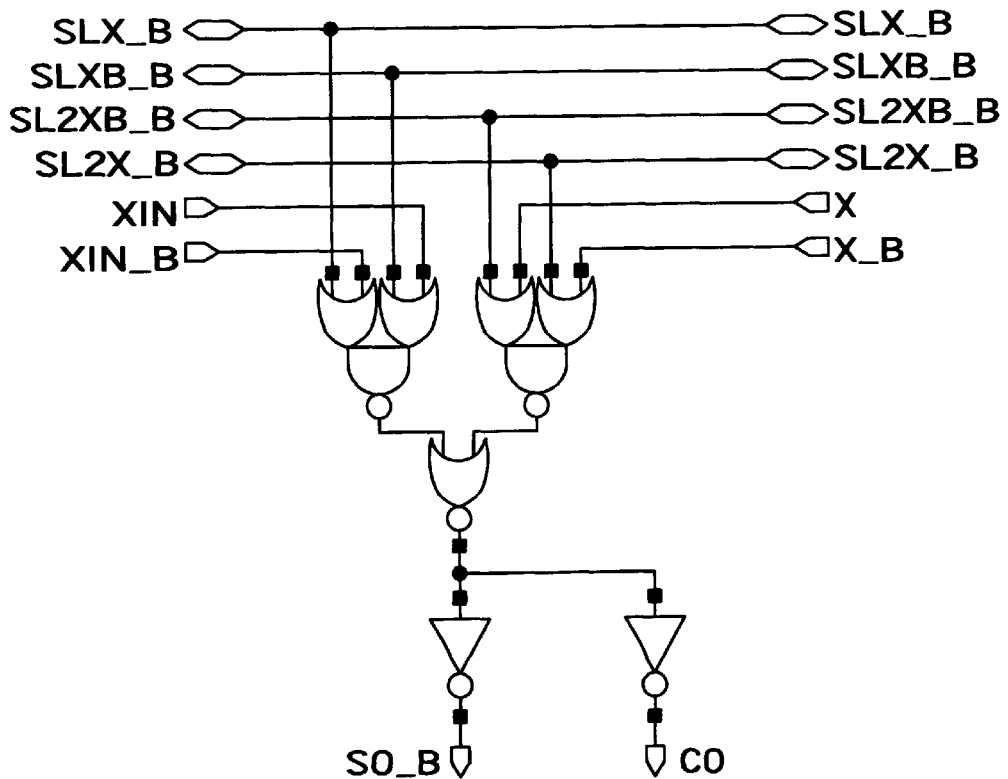
FIG. 9 is a diagram showing an exemplary circuit arrangement of a circuit MFAC0S1 logically converted from MFA used in FIG. 2.
Figure 10:
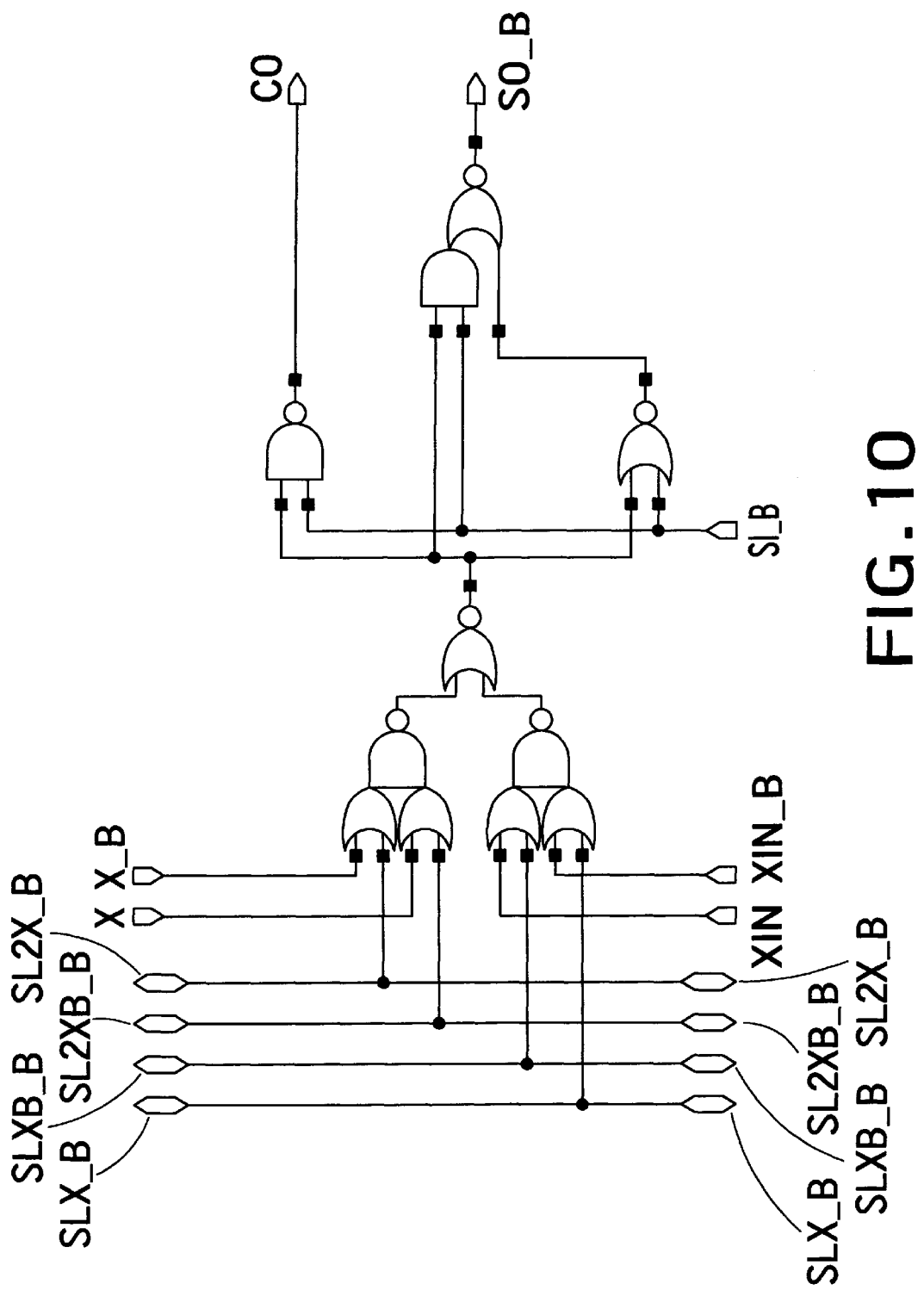
FIG. 10 is a diagram showing an exemplary circuit arrangement of a circuit MFAC1 logically converted from MFA used in FIG. 2.
Figure 11:
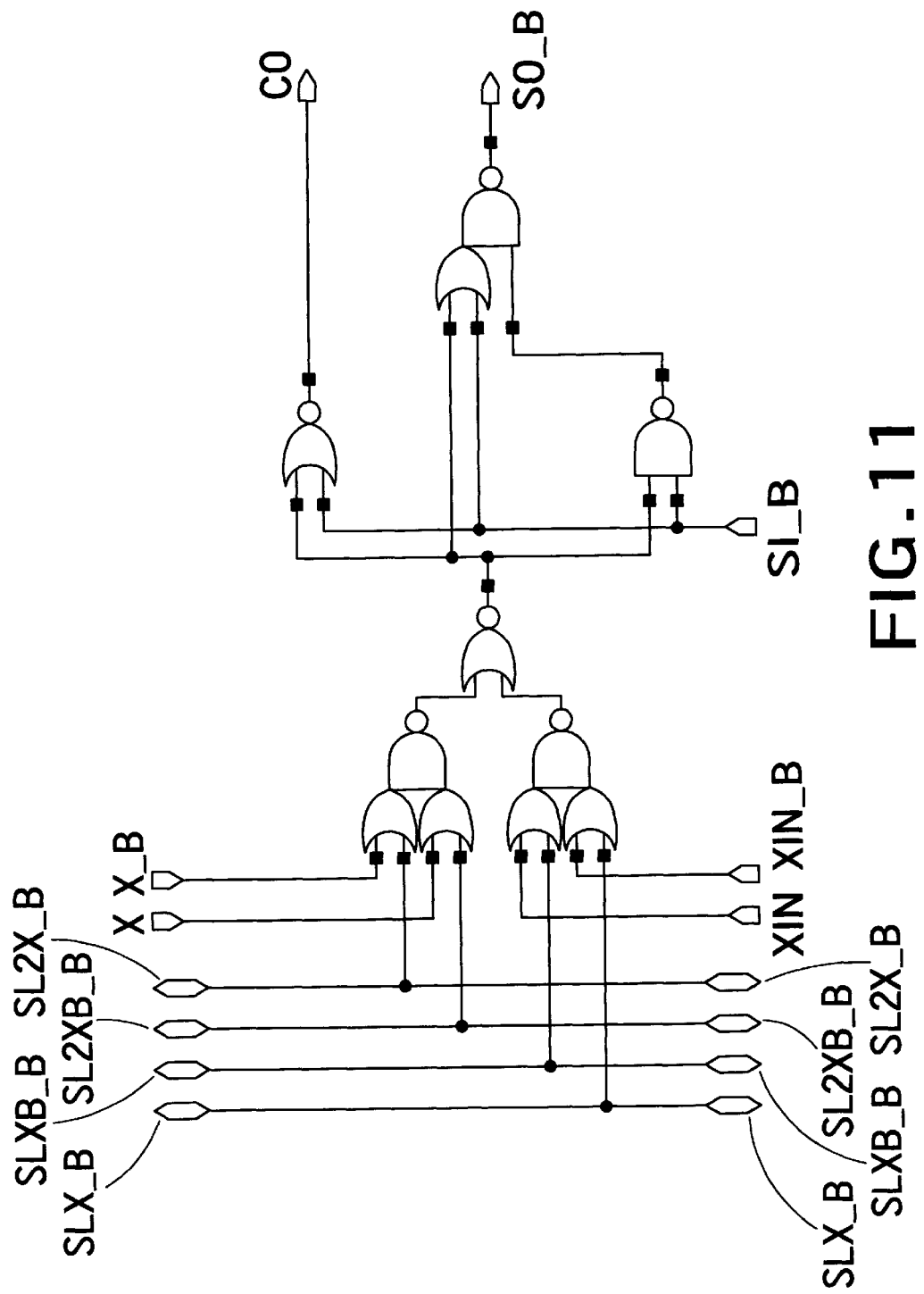
FIG. 11 is a diagram showing an exemplary circuit arrangement of a circuit MFACO logically converted from MFA used in FIG. 2.
Figure 12:
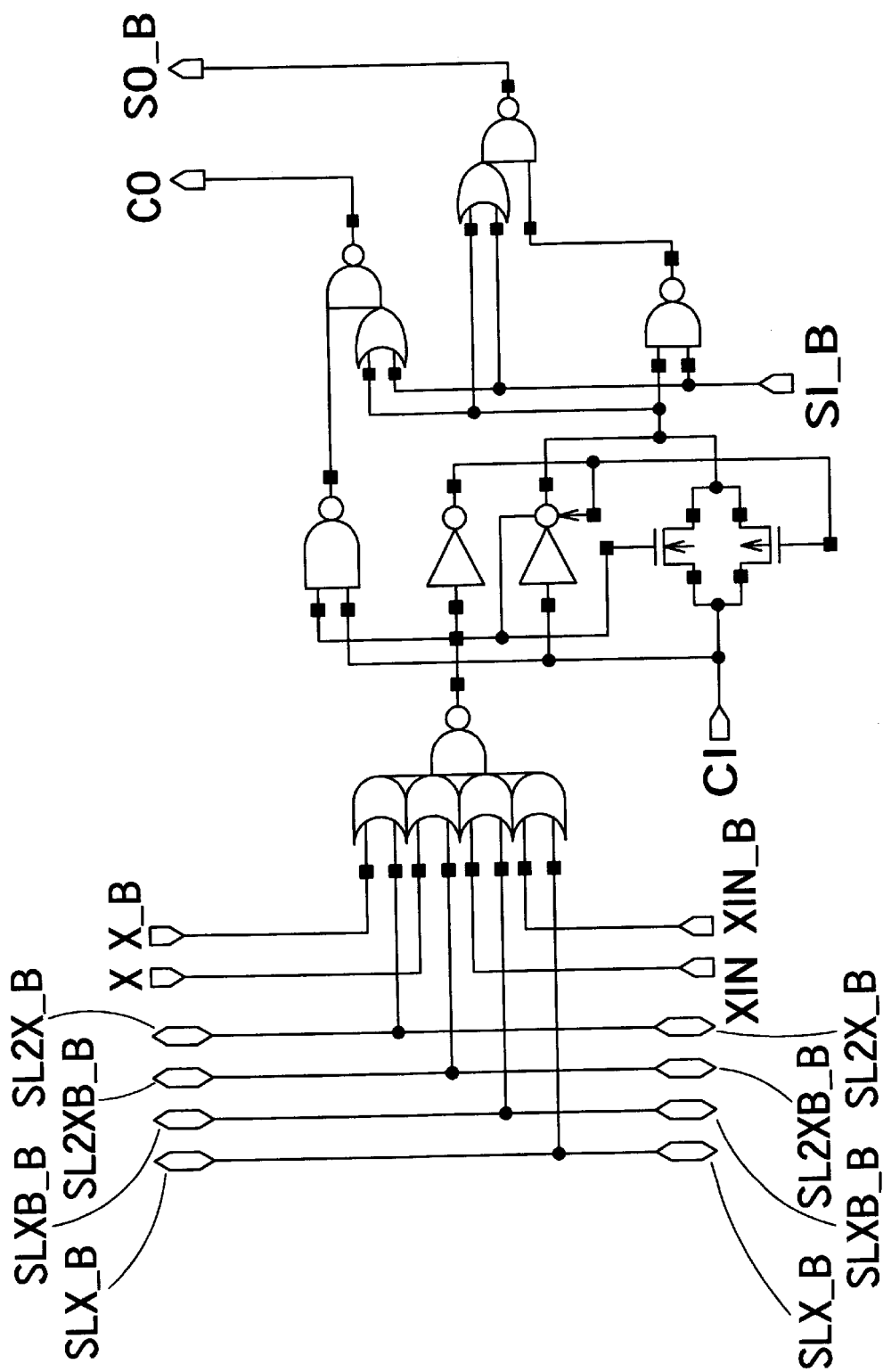
FIG. 12 is a diagram showing an exemplary circuit arrangement of a circuit MFA combining the partial multiplication selector circuit and a total adder used in FIG. 2.
Figure 13:
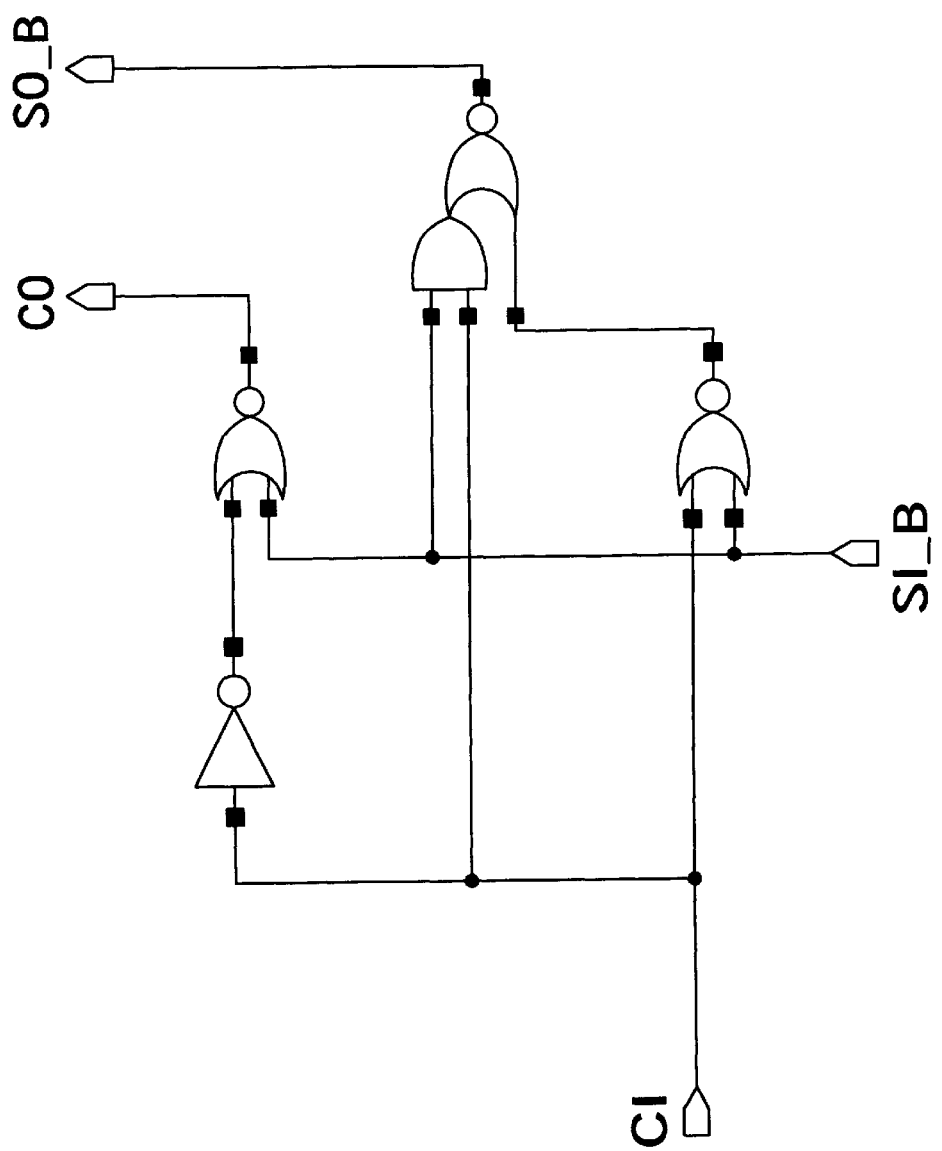
FIG. 13 is a diagram showing an exemplary circuit arrangement of a half adder circuit MHA used in FIG. 2.
Figure 14:
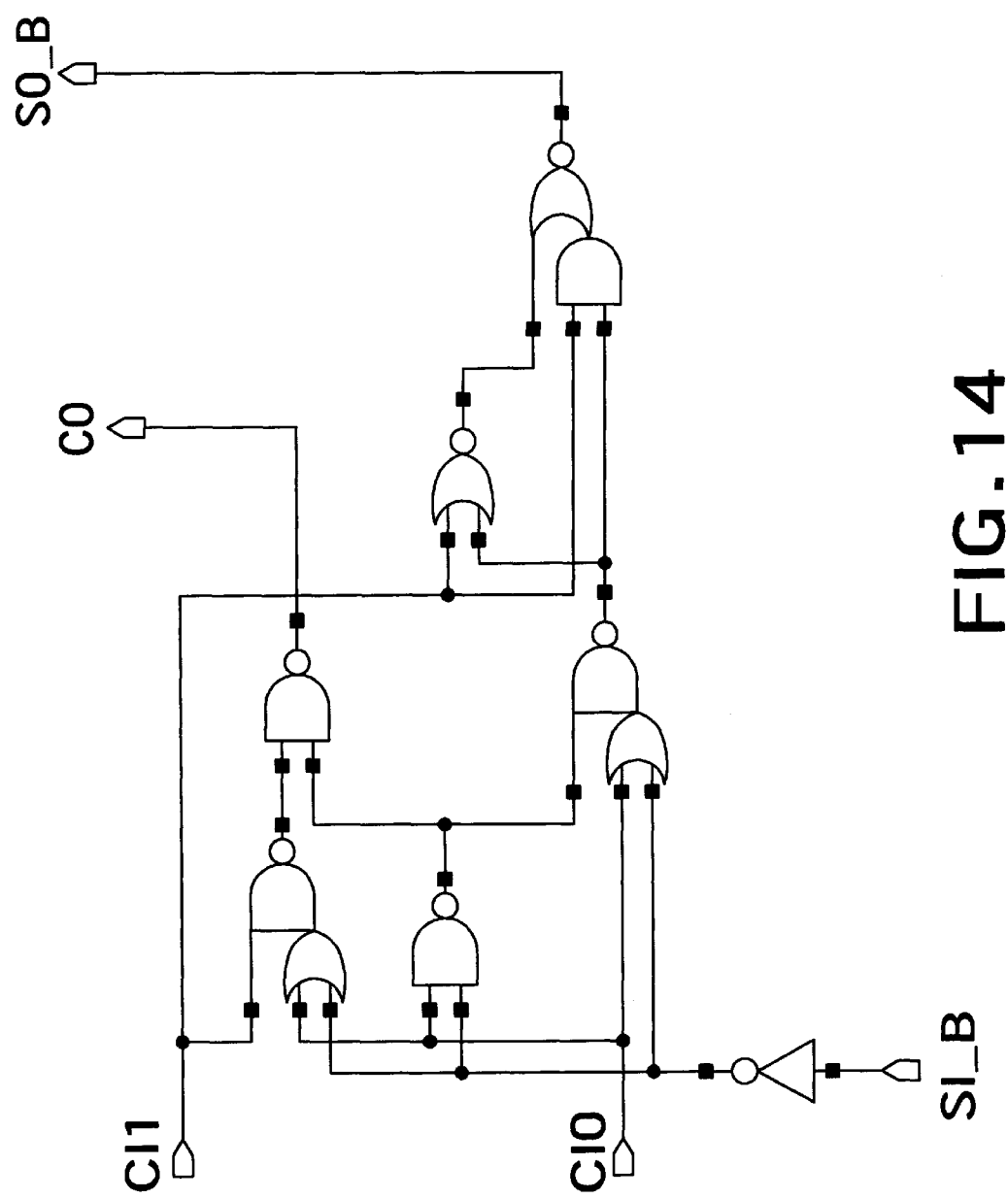
FIG. 14 is a diagram showing an exemplary circuit arrangement of a total adder circuit MFAZ used in FIG. 2.

Still referring to FIG. 2, the partial multiplier/partial adder circuit 30 includes a drive circuits DRV, code extension selector circuits MSSL, partial multiplication selector circuits MSL, circuits MFA combining partial multiplication selector circuits and total adders, circuits MFAC0S1, MFAC1 and MFAC0 which are logically converted from MFA where necessary, half adder circuit MHA, and total adder circuits MFAZ. The partial multiplier/partial adder circuit 30 is supplied with a multiplicand B of 12 bits, BM0 through BM11, via drive circuits DRV. The multiplicand B is data expressed by complements of 2. An exemplary circuit arrangement of the drive circuit DRV is shown in FIG. 6. An exemplary circuit arrangement of the code extension selector circuit MSSL is shown in FIG. 7. An exemplary circuit arrangement of the partial multiplication selector circuit MSL is shown in FIG. 8. Exemplary circuit arrangements of the circuits MFAC0S1, MFAC1 and MFAC0 which are logically converted from MFA where necessary are shown in FIGS. 9, 10 and 11, respectively. An exemplary circuit arrangement of the circuit MFA combining a partial multiplication selector circuit and a total adder is shown in FIG. 12. An exemplary circuit arrangement of the half adder circuit MHA is shown in FIG. 13. An exemplary circuit arrangement of the total adder circuit MFAZ is shown in FIG. 14. The partial multiplication selector circuit in the circuit MFA combining the partial multiplication selector circuit and the total circuit is different from the partial multiplication selector circuit in the circuits MFAC0S1, MFAC1 and MFAC0 which are logically converted from MFA, for the purpose of increasing the calculation speed.

Figure 15:
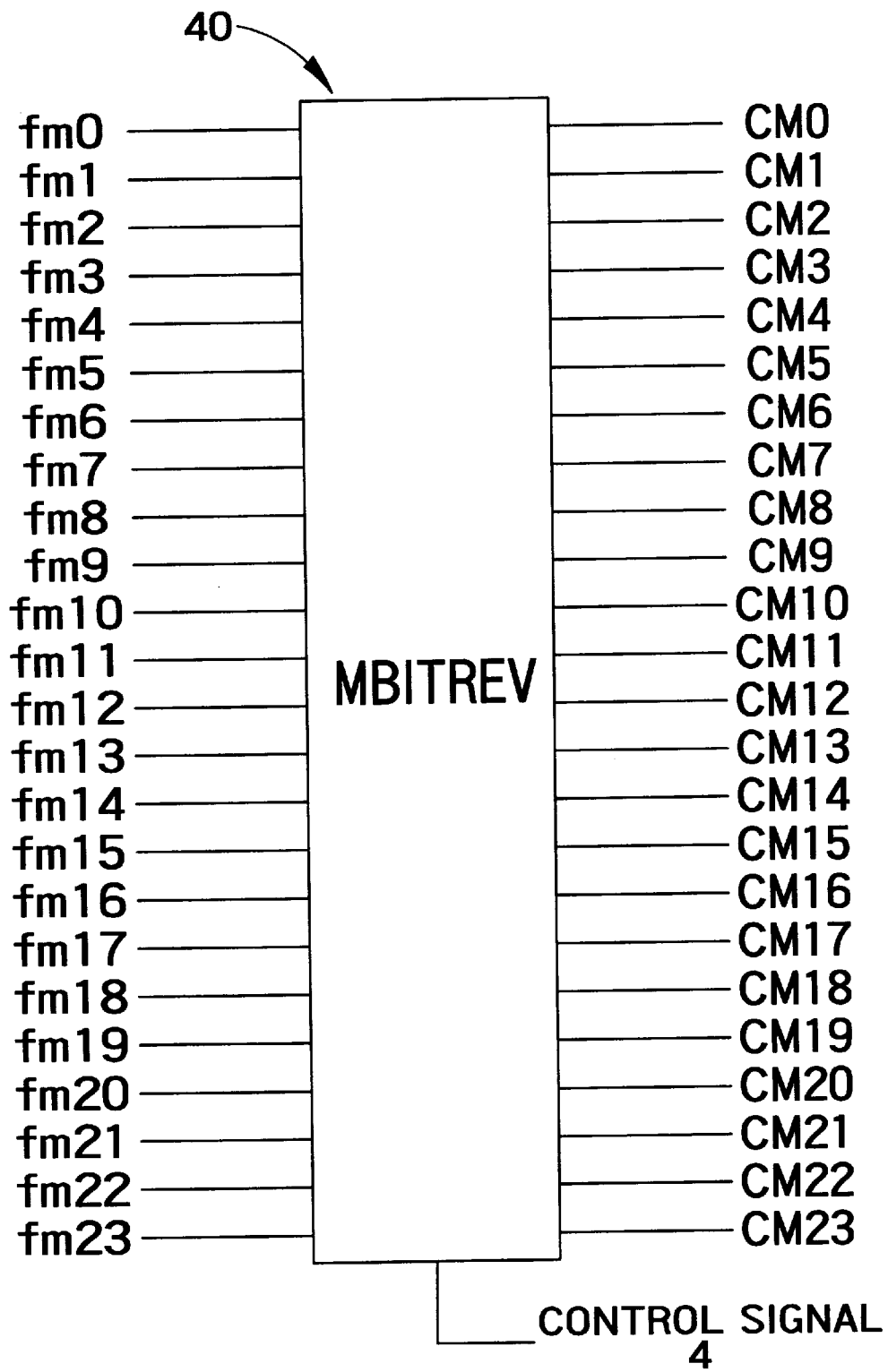
FIG. 15 is a diagram showing an exemplary circuit arrangement of a bit inverter circuit.
Figure 16:
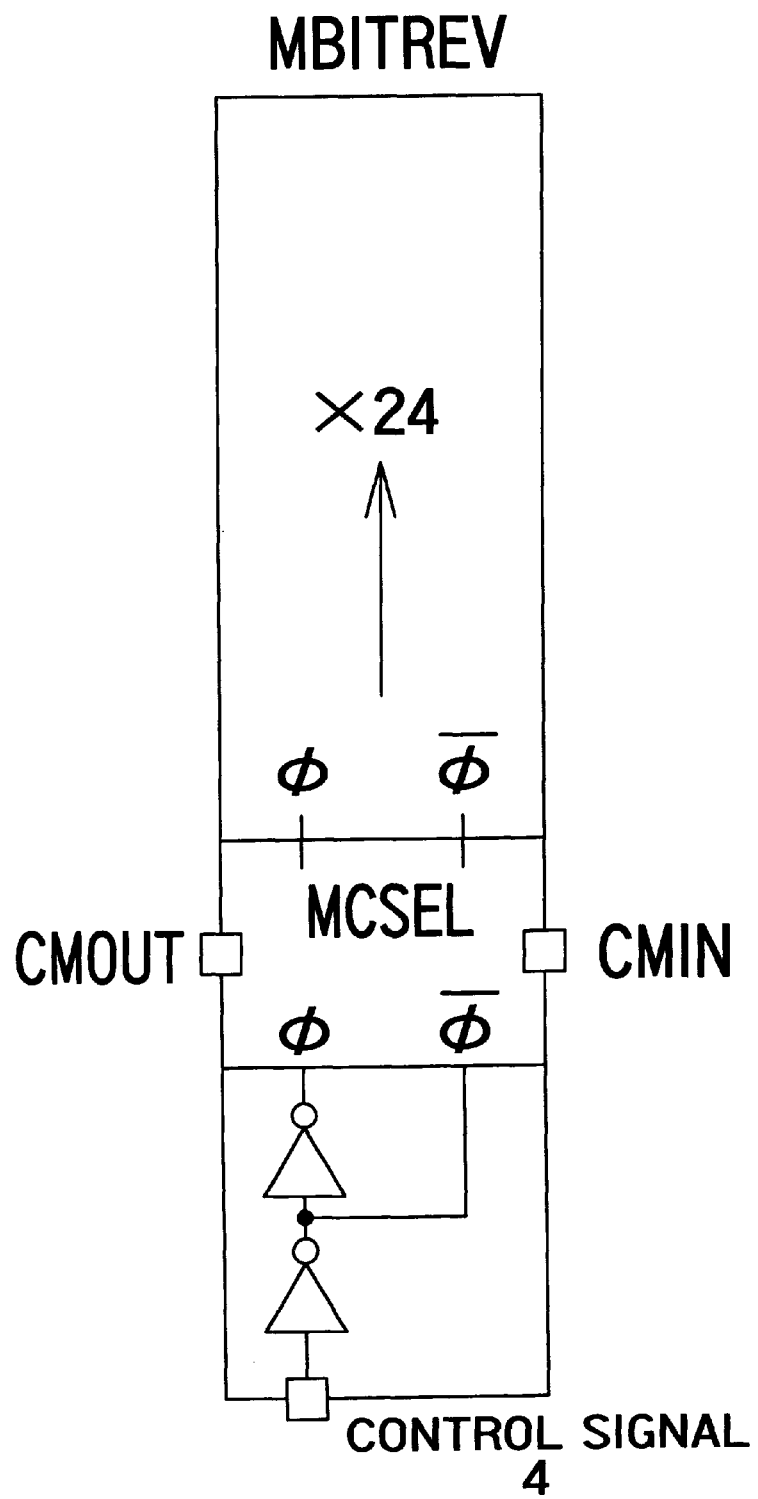
FIG. 16 is a diagram showing an exemplary circuit arrangement of a bit inverter circuit MBITREV used in FIG. 15.
Figure 17:
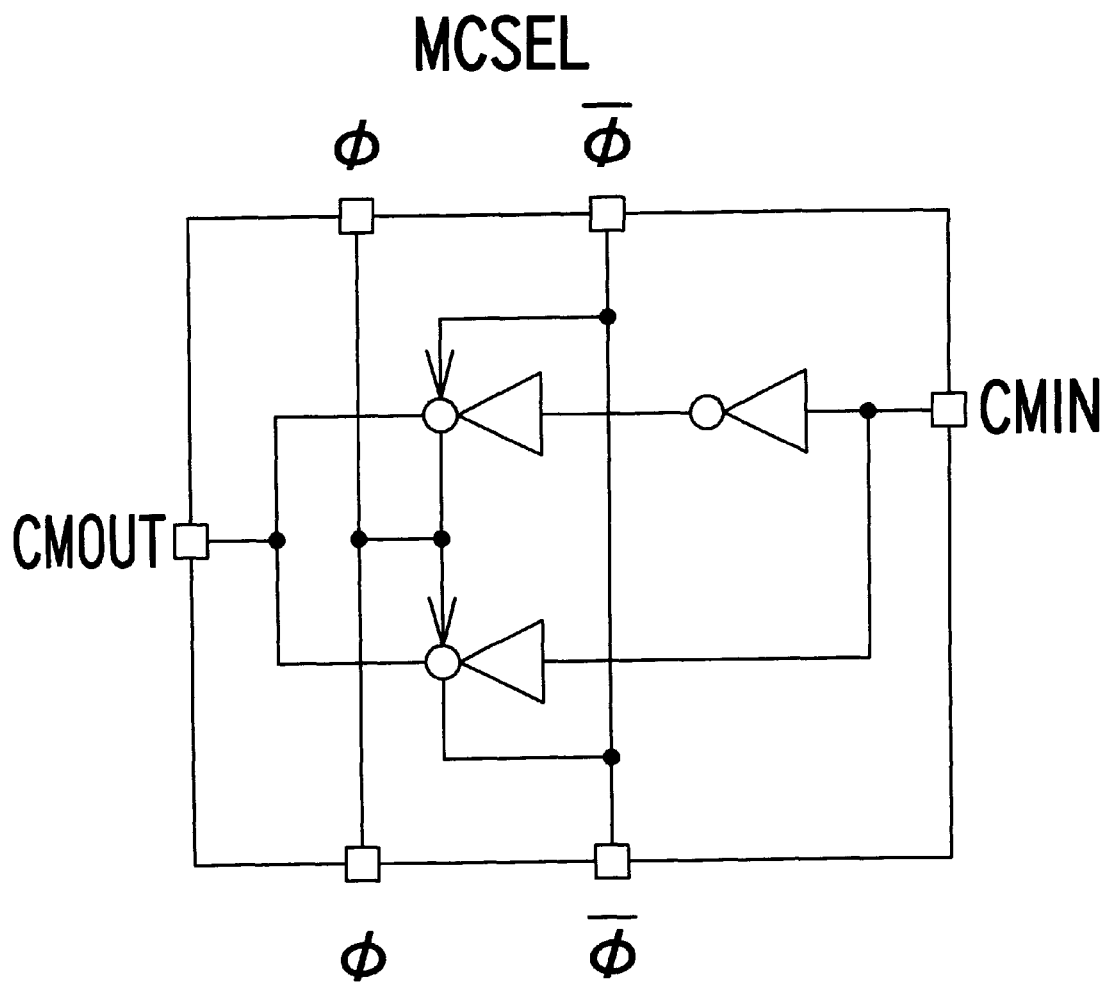
FIG. 17 is a diagram showing an exemplary circuit arrangement of a selector circuit MCSEL used in FIG. 2.

FIG. 15 shows an exemplary construction of the bit inverter circuit 40. As shown in FIG. 15, the bit inverter circuit 40 includes a bit inverter MBITREV. The bit inverter MBITREV is supplied with an addend C of 24 bits, CM0 to CM23. The addend C is data expressed by complements of 2. Also the control signal 4 is input there. As explained above, it outputs the addend C as data f directly or by inverting the addend C, depending upon the value of the control signal 4. Therefore, also the data f consists of 24 bits, fm0 to fm23. These bits fm0 to fm23 are input into the partial multiplier/partial adder circuit 30 as shown in FIG. 2. The bit inverter MBITREV is made by providing 24 selective circuit MCSEL as shown in FIG. 16. An exemplary circuit arrangement of the selective circuit MCSEL is shown in FIG. 17.

Figure 18:
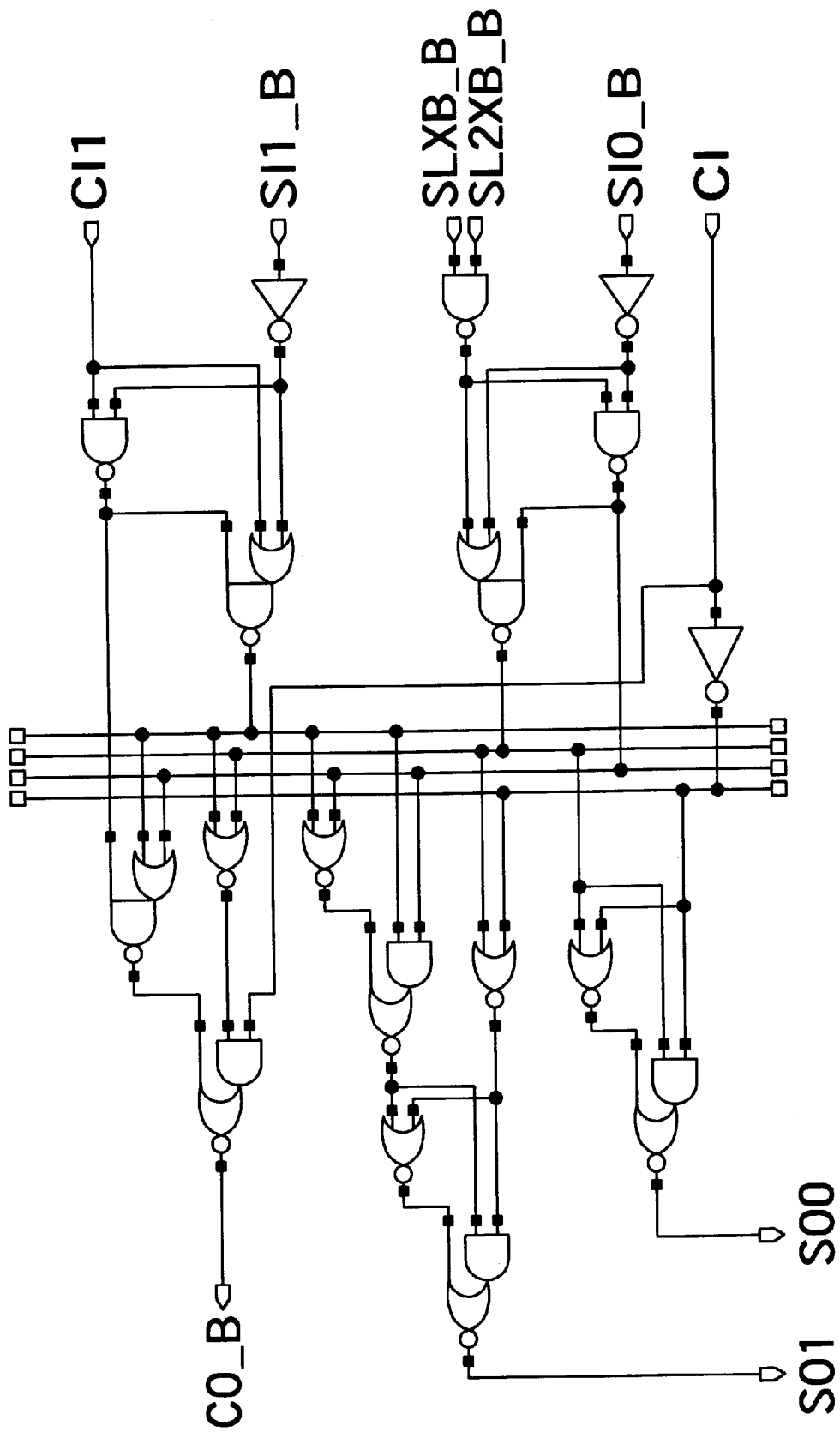
FIG. 18 is a diagram showing an exemplary circuit arrangement of first CLA circuit MCLA2N1 used in FIG. 2.
Figure 19:
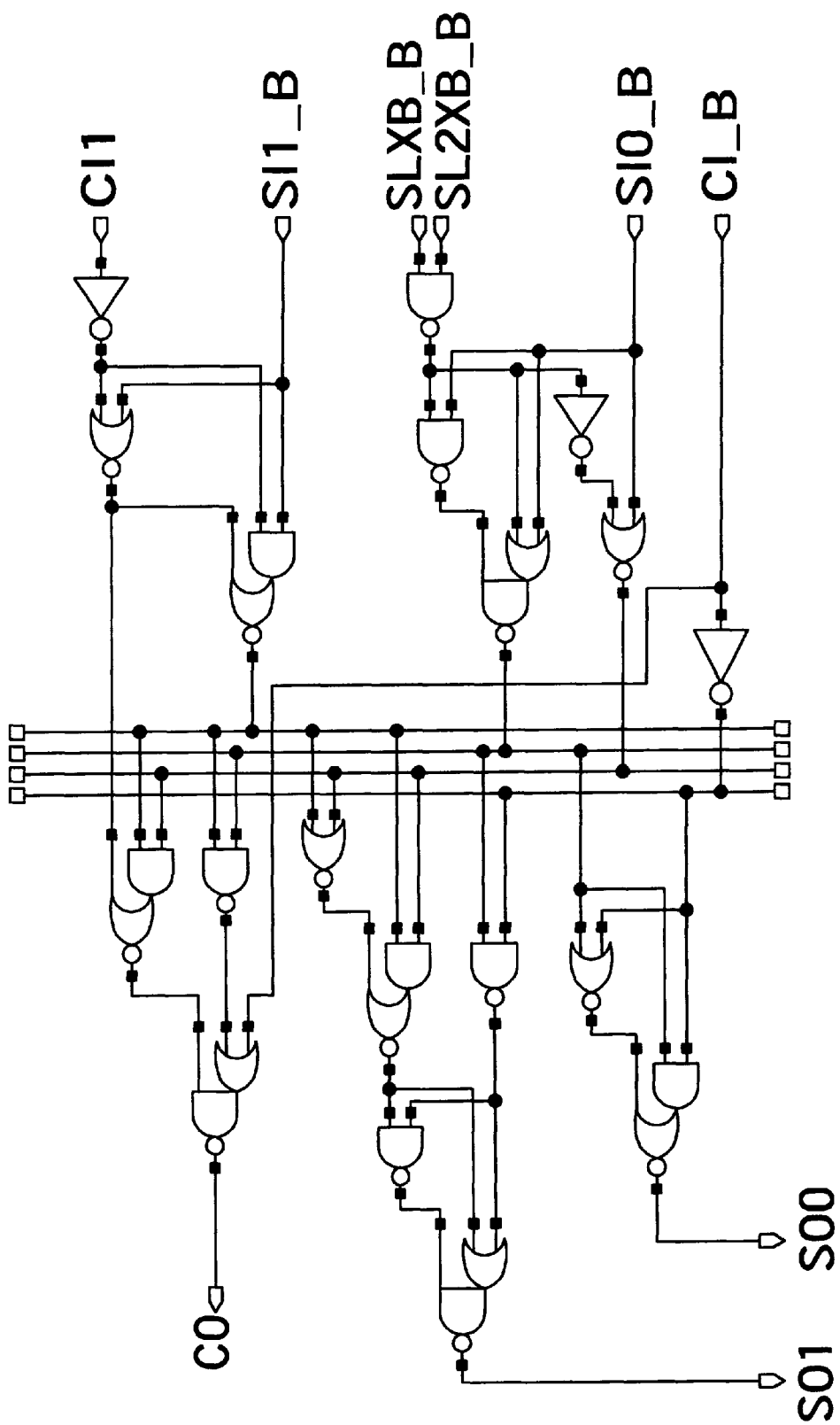
FIG. 19 is a diagram showing an exemplary circuit arrangement of a second CLA circuit MCLA2N2 used in FIG. 2.
Figure 20:
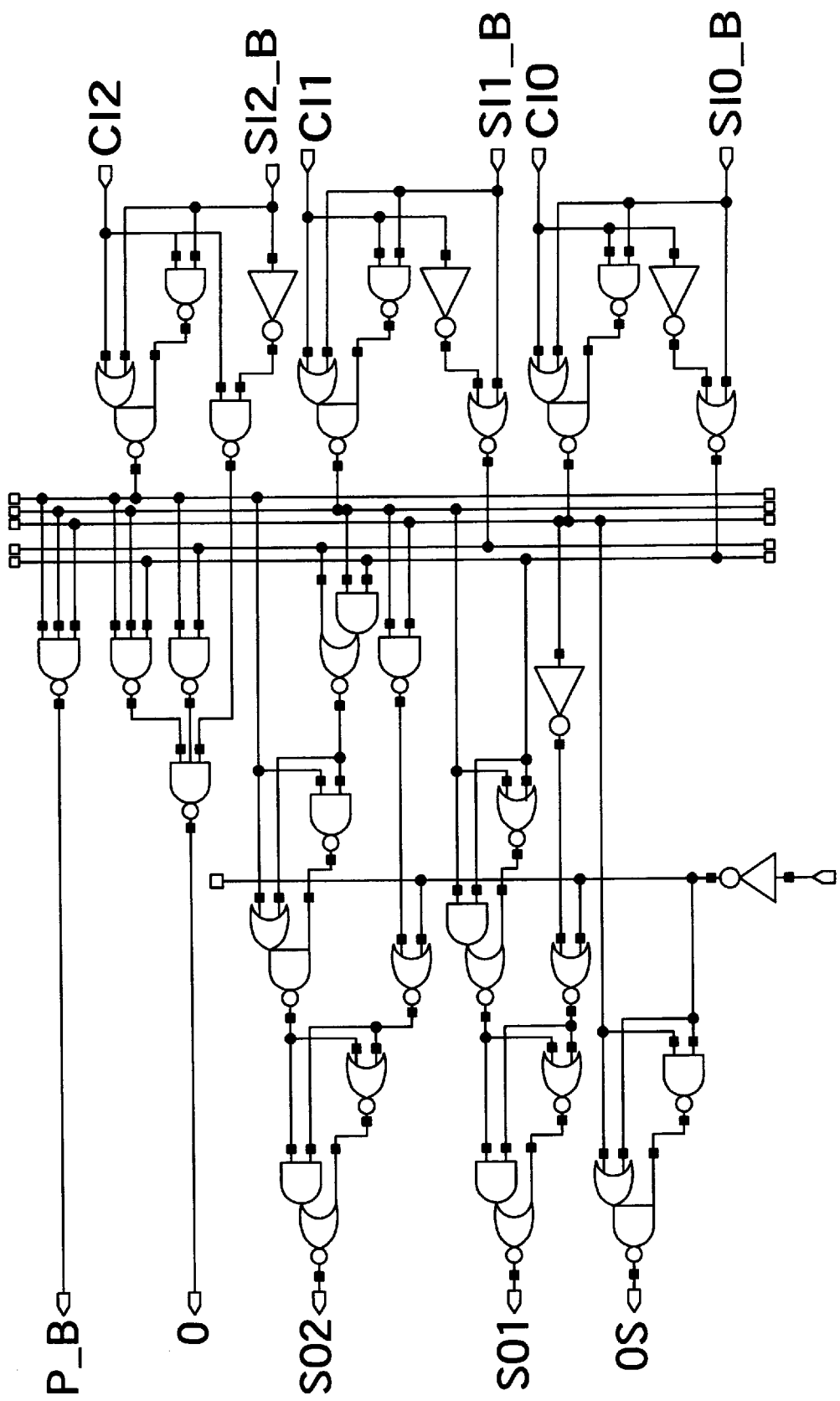
FIG. 20 is a diagram showing an exemplary circuit arrangement of a third CLA circuit MCLA3 used in FIG. 2.
Figure 21:
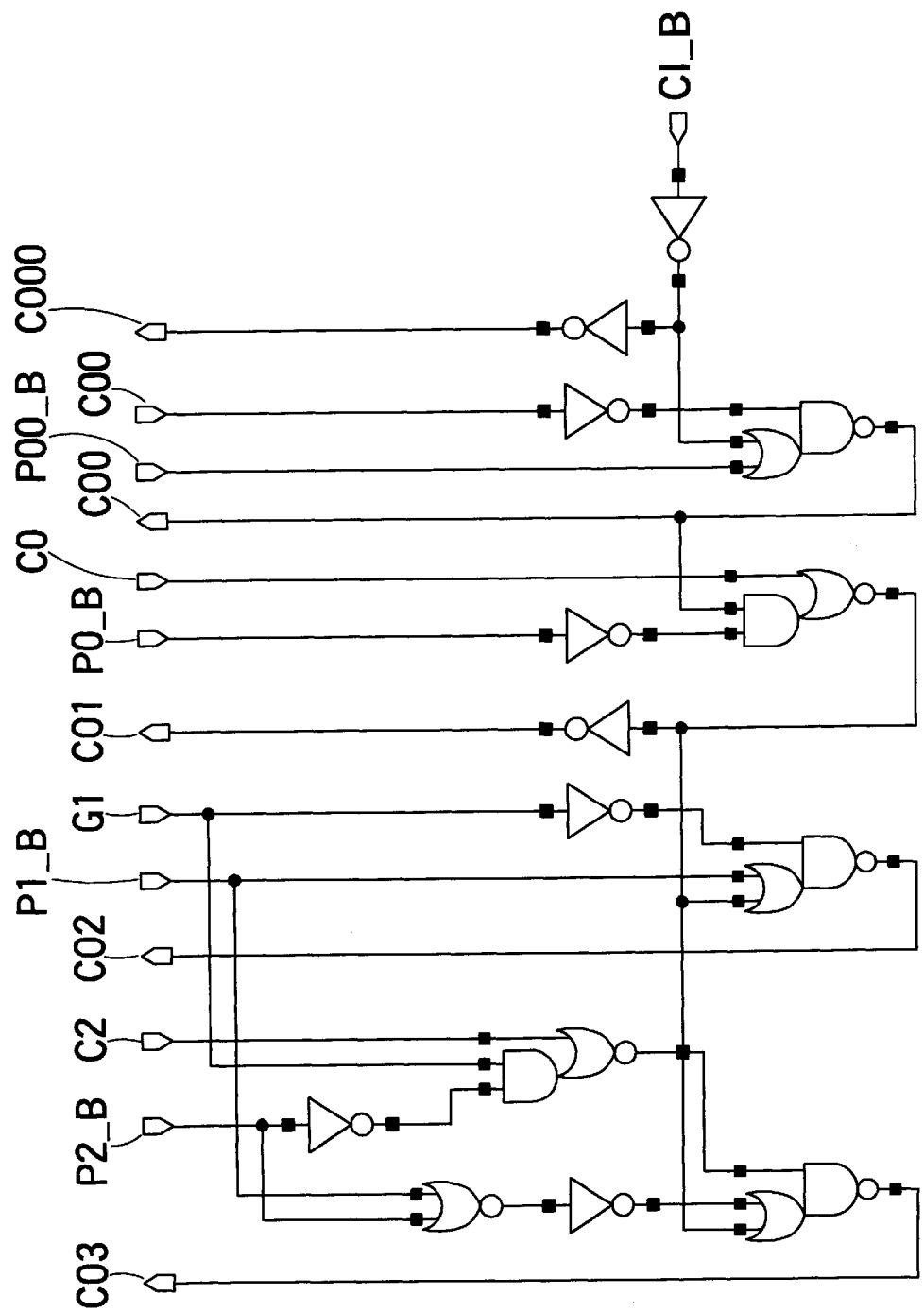
FIG. 21 is a diagram showing an exemplary circuit arrangement of a fourth CLA circuit MBCLA used in FIG. 2.

As shown in FIG. 2, the final adder circuit 50 includes first CLA circuits MCLA2N1, second CLA circuits MCLA2N2, third CLA circuits MCLA3 and fourth CLA circuit MBCLA. From these circuits, a result of operation Z consisting of 24 bits, ZM0 to ZM23, is output. An exemplary circuit arrangement of the first CLA circuit MCLA2N1 is shown in FIG. 18. An exemplary circuit arrangement of the second CLA circuit MCLA2N2 is shown in FIG. 19. An exemplary circuit arrangement of the third CLA circuit MCLA3 is shown in FIG. 20. An exemplary circuit arrangement of the fourth CLA circuit MBCLA is shown in FIG. 21. The reason why the first CLA circuits MCLA2N1 and second CLA circuits MCLA2N2 are located alternately as shown in FIG. 1 lies in that one step of gate is sufficient for propagation of a carry signal between these blocks. Thus, the calculation speed is increased.

It will be understood from the foregoing explanation that, since the multiplier/adder/subtracter according to the embodiment commonly is configured to commonly use the circuit for adding partial products and the circuit for addition and subtraction of C, a decrease in circuit scale and an increase in calculation speed are attained. That is, because multiplication need not be completed prior to addition or subtraction, the calculation speed can be increased, and the circuit area can be reduced. More specifically, an increase in calculation speed by approximately 10% through 20% from the conventional speed is expected, and a decrease of the circuit area by 10% through 20% from the conventional area is expected.

In greater detail, when multiplication A×B is done upon introducing the multiplier A into the booth decoder circuit 20, A is directly input to the booth decoder circuit 20. When multiplication −A×B is done, the sign of A is inverted, and −A is input to the booth decoder circuit 20. Further, when C is added to the result of the multiplication, C is input to the partial multiplier/partial adder circuit 30. When −C is added to the result of the multiplication, C in the bit-inverted form is input to the partial multiplier/partial adder circuit 30, and 1 is added in the final adder circuit 50. Therefore, it is not necessary to use another adder for addition of ±(A×B) and ±C, which was indispensable in the prior art. The adder of this type is typically designed for CLA and becomes large in circuit scale. However, the embodiment can omit the adder with a large circuit scale. As a result, the entire circuit area can be reduced. Moreover, in addition to a decrease of the circuit area, improvement of the calculation speed and a decrease of consumption power can be attained.

Furthermore, when −C is added to the result of multiplication, a number bit-inverted from the addend C is input to the partial multiplier/partial adder circuit 30, and 1 is added to the least significant bit in the final adder circuit 50. Therefore, the embodiment does not require another adder circuit for adding 1 to the least significant bit to express −C by complements of 2.

Figure 21A:
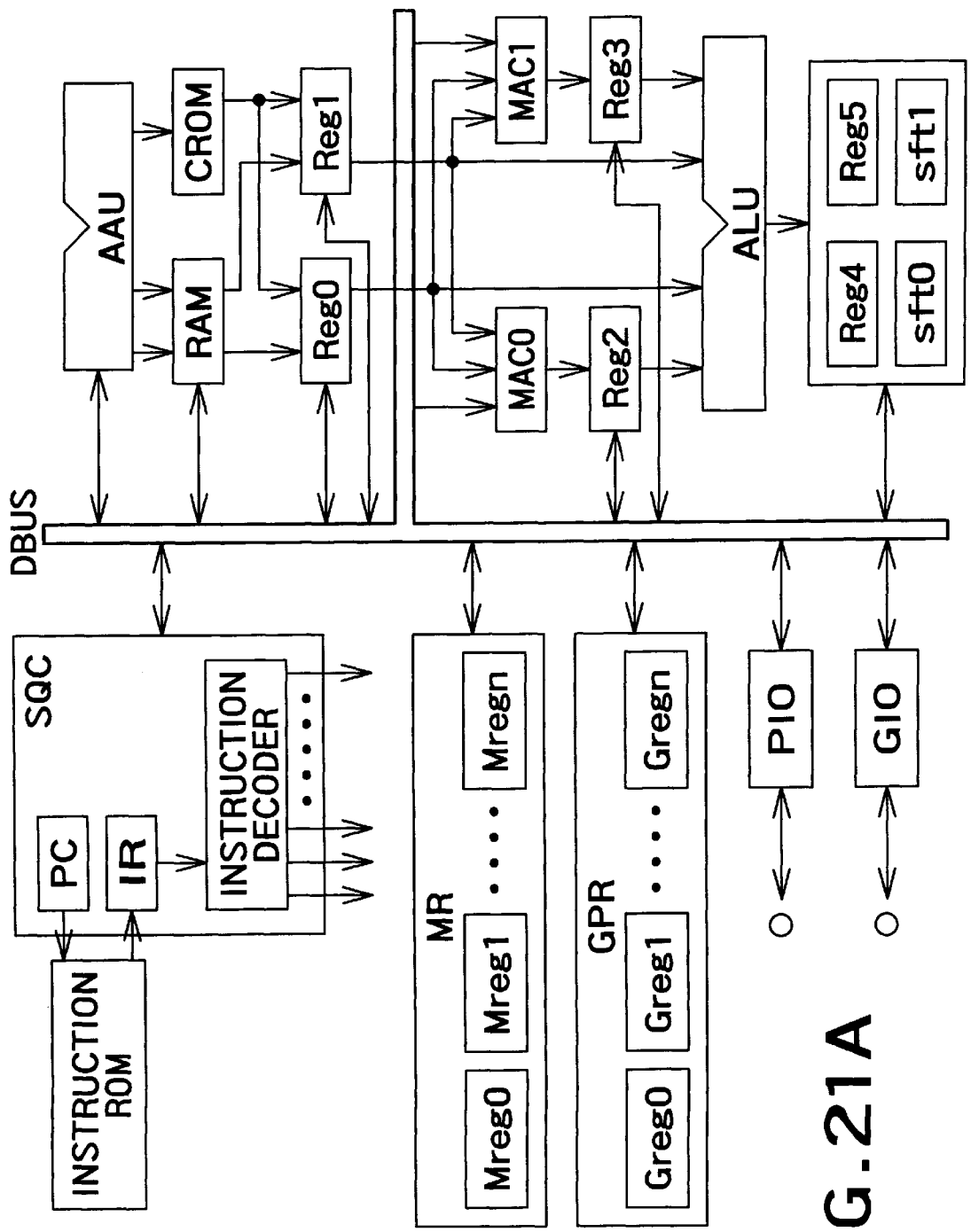
FIG. 21A is a block diagram generally showing a construction of a digital signal processor using a multiplier/adder/subtracter according to the embodiment of the invention.

FIG. 21A is a diagram showing a digital signal processor (DSP) using the multiplier/adder/subtracter according to the embodiment. The digital signal processor is used in a portable telephone, for example. As shown in FIG. 21A, the digital signal processor includes a sequence controller SQC, address arithmetic unit AAU, arithmetic logical unit ALU, registers Reg0 to Reg5, shift registers sft0 and sft1, general purpose register GPR, mode register MR, parallel I/O PIO, and general purpose I/O GIO. The multiplier/adder/subtracter according to the invention corresponds to MAC0 and MAC1. That is, the digital signal processor shown in FIG. 21A uses two multiplier/adder/subtracters. These are connected to a data bus DBUS directly or indirectly.

The sequence controller SQC is a controller which mainly extracts instructions. The sequence controller SQC has a program counter PC for storing the address of an instruction to be next extracted, and an instruction register IR for temporarily storing the extracted instruction. The address arithmetic unit AAU is an operator for executing various address operations and for determining the address to be accessed. The arithmetic logical unit ALU is an arithmetic logical operator for executing logic operation such as AND, OR, exclusive OR, exclusive AND, etc. The registers Reg0 to Reg5 are registers for holding data for a while. The shift registers sft0 and sft1 are registers for shifting data and for holding the data for a while. The general purpose register GPR is a widely used register for holding data for a while. The mode register MR is a register for controlling the operation mode, which is used for changing the operation mode.

Figure 21B:
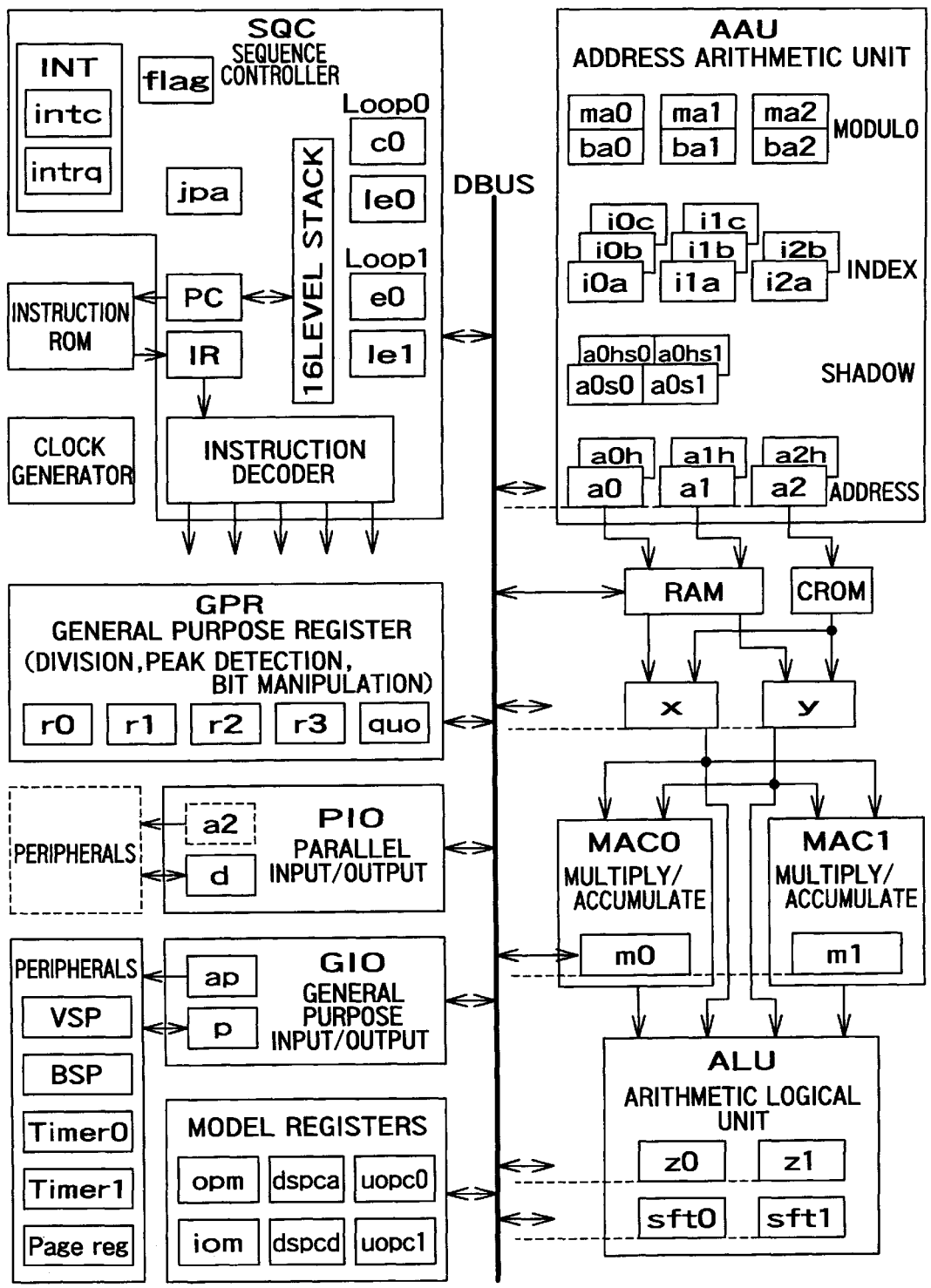
FIG. 21B is a block diagram showing the construction of the digital signal processor in greater detail.

The construction of the digital signal processor in FIG. 21A is shown in greater detail in FIG. 21B.

Figure 22:
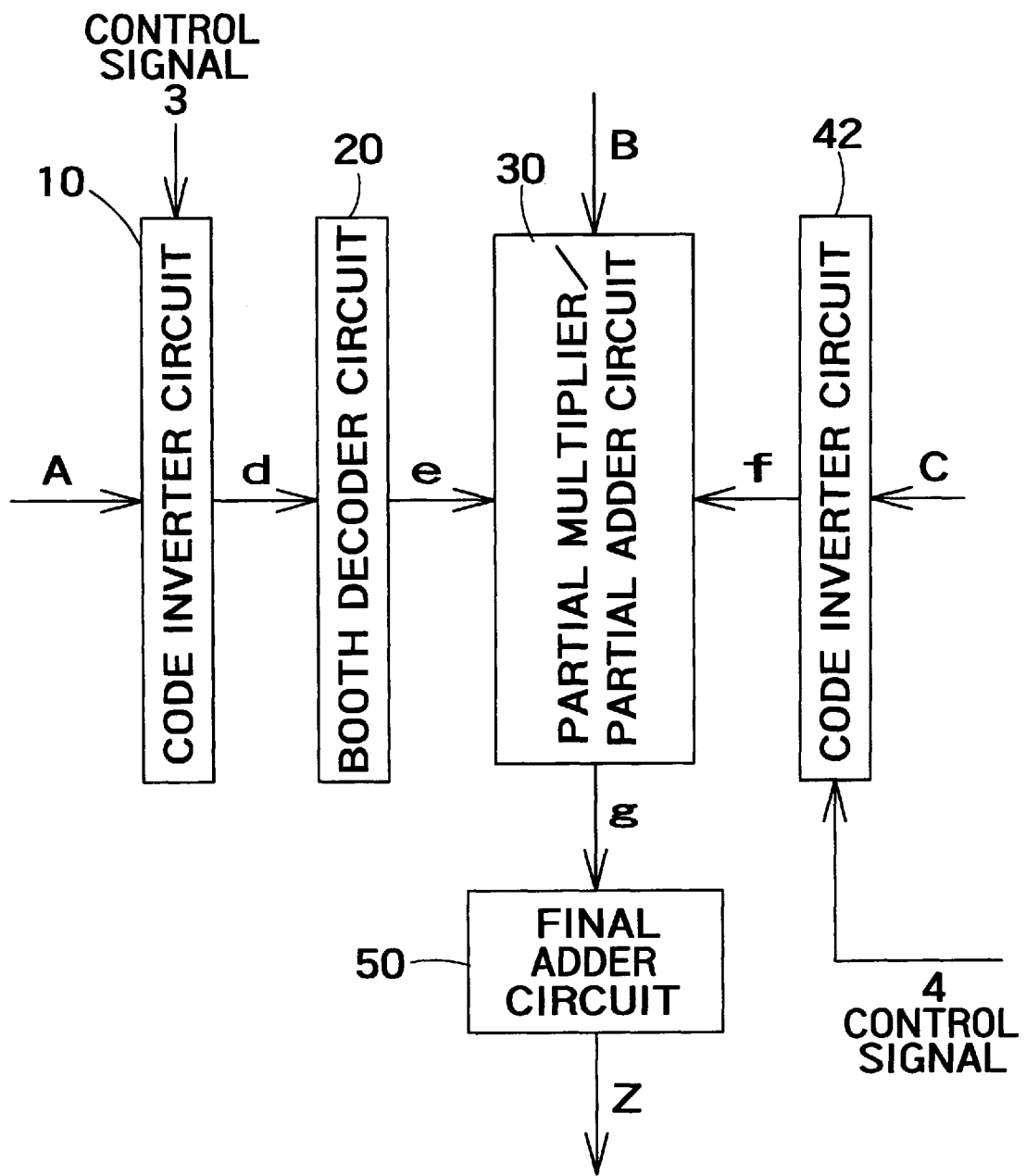
FIG. 22 is a diagram showing another modification of the invention.

The invention is not restricted to the embodiments shown above, but it can be modified in various modes. For example, as shown in FIG. 22, a code inverter circuit 42 may be added in the former stage of the partial multiplier/partial adder circuit 30. By using the code inverter circuit 42, C or −C can be input to the partial multiplier/partial adder circuit 30. Therefore, when −C is added, 1 need not be added in the final adder circuit 50. Further, as understood from FIG. 1, the circuit for generating products as a multiplier portion in the partial multiplier/partial adder circuit 30 can be regarded as a sign-attached partial product generating circuit whereas the adder portion of the partial multiplier/partial adder circuit 30 and the final adder circuit 50 in combination can be regarded as a sign-attached adder circuit. In this manner, the embodiment results in performing addition of ±C as a part of addition of partial products ±A×B.

Figure 23:
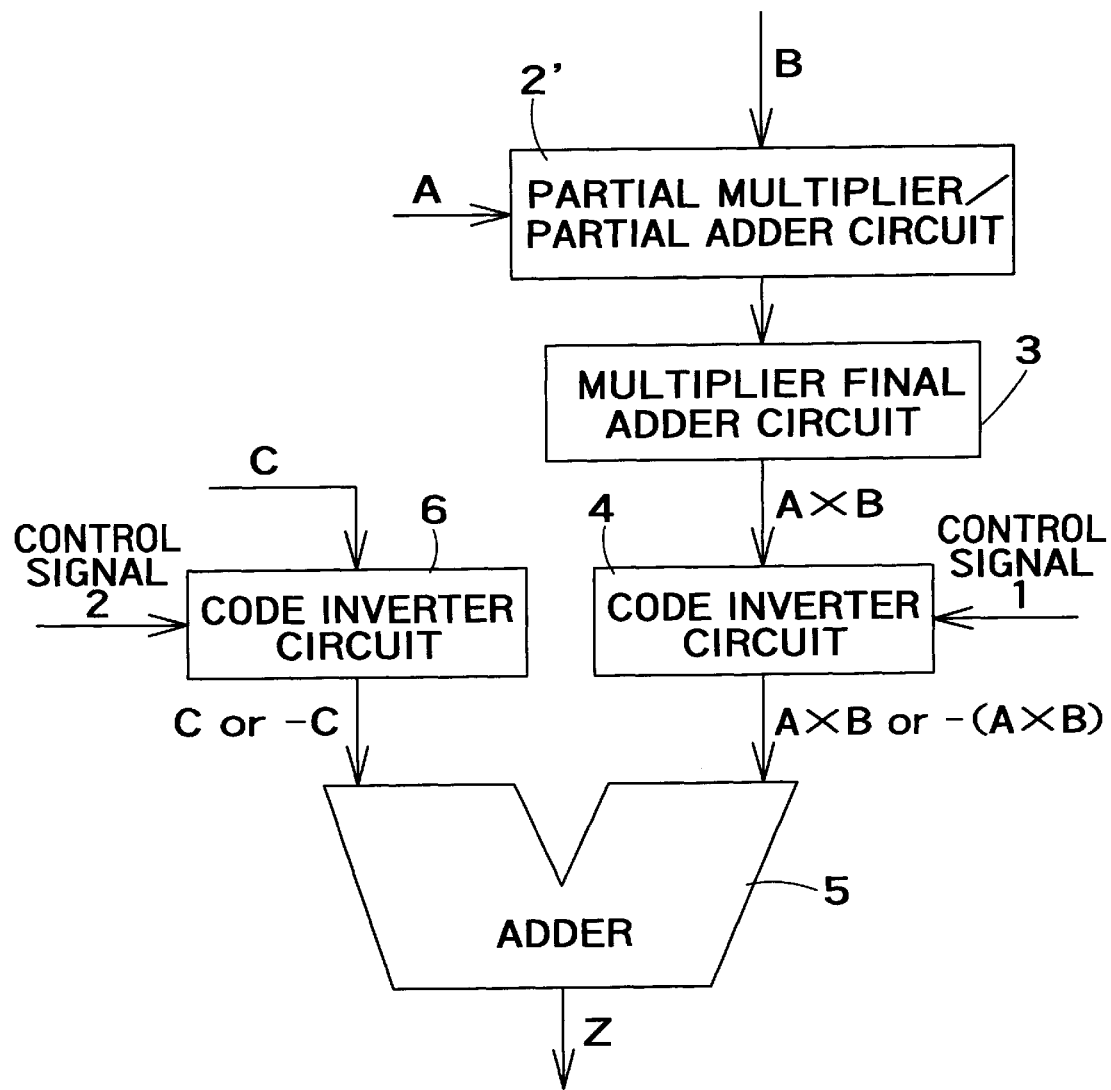
FIG 23 is a block diagram of a multiplier/adder/subtracter for a conventional algorithm.
Figure 24:
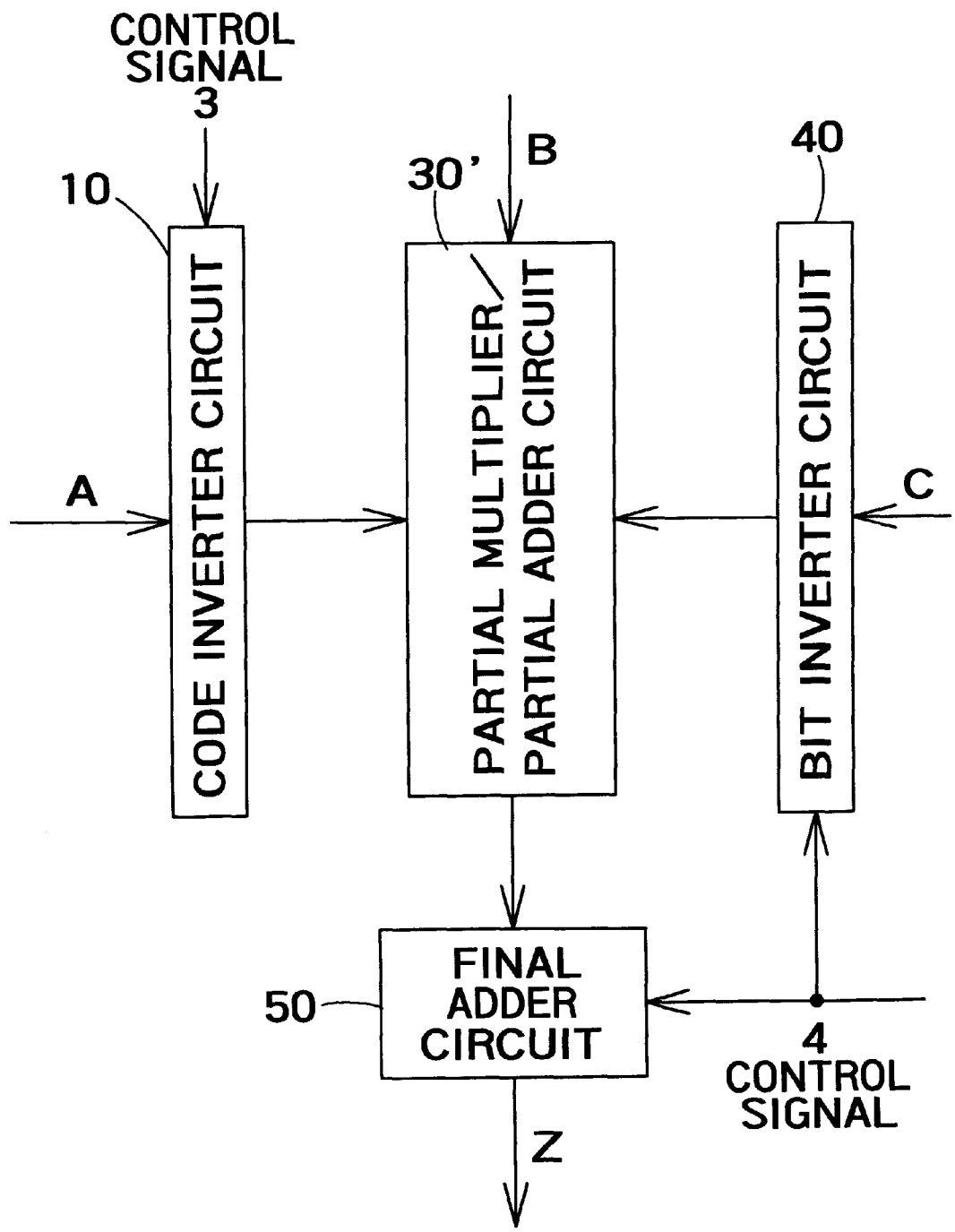
FIG. 24 is a block diagram showing a construction in which the invention is applied to the multiplier/adder/subtracter shown in FIG. 23.

Although the embodiment has been explained as conducting multiplication by booth algorithm, it is applicable also to any other multiplication algorithm generating partial products. FIG. 23 is a block diagram of a multiplier/adder/subtracter for such operation between complements of 2, which does not use the prior art booth algorithm. If the invention is applied to the multiplier/adder/subtracter, then the circuit becomes as shown in FIG. 24. That is, the booth decoder circuit 20 need not be used, and the partial multiplier/partial adder circuit 30' produces partial products of the multiplier A and shifts the multiplier A by one bit when the multiplicand B is 1, and executes only one-bit shifting of the multiplier A when the multiplicand B is 0, in the similar manner as manual calculation.

Figure 25:
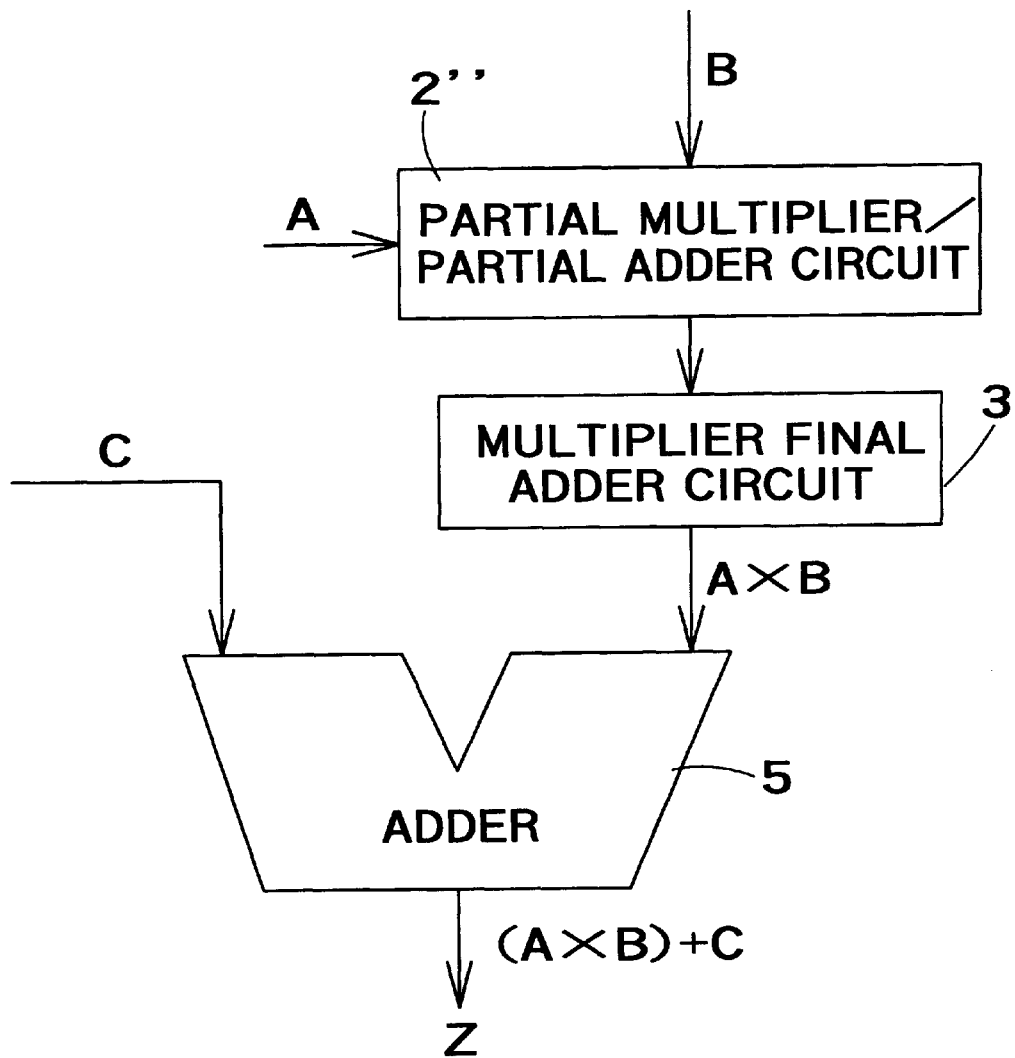
FIG. 25 is a block diagram of a conventional multiplier/adder for binary numbers without signs.
Figure 26:
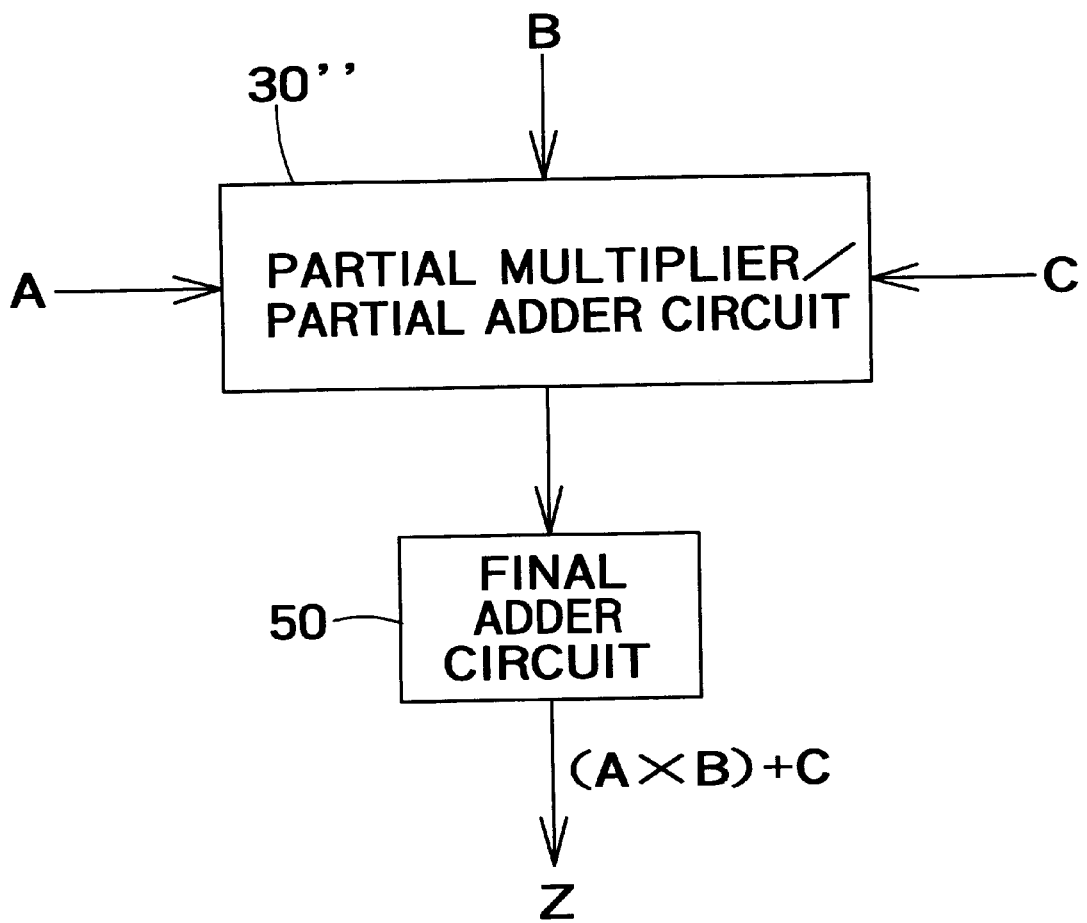
FIG. 26 is a block diagram of a construction in which the invention is applied to the multiplier/adder shown in FIG. 25.
Figure 27:
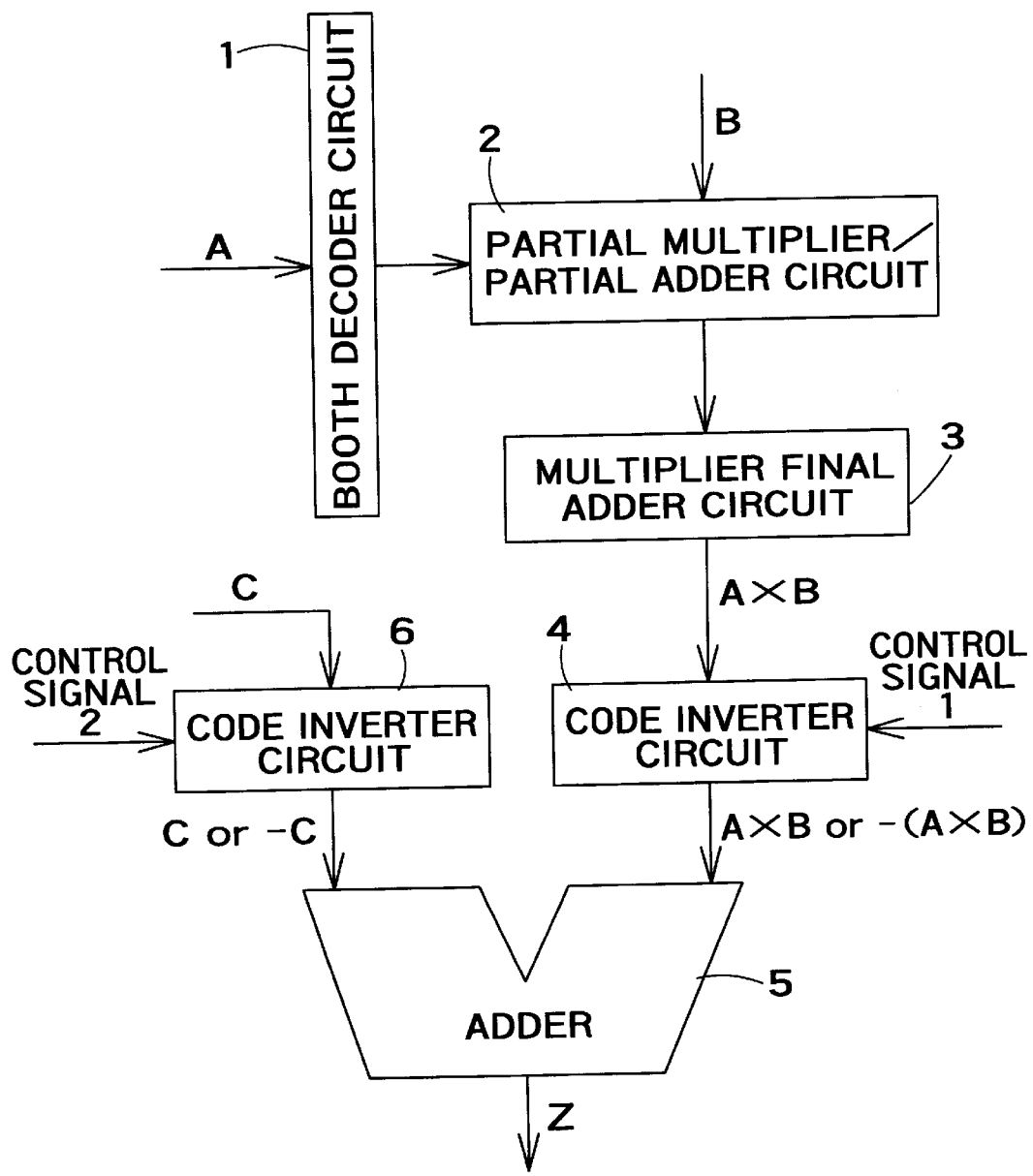
FIG. 27 is a diagram of a conventional multiplier/adder/subtracter.

FIG. 25 is a block diagram of a conventional construction of a multiplier/adder for binary numbers without signs. That is, it is an operator for operating (A×B)+C. When the invention is applied to a multiplier/adder of this type, the circuit shown in FIG. 26 is formed. As shown in FIG. 26, since operation is done without signs, also the code inverter circuit 10 and the bit inverter circuit 40 need not be used. That is, A, B and C are directly input to the partial multiplier/partial adder circuit 30".

As explained above, according to the invention, the multiplier/adder/subtracter for calculating ±A×B)±C (the order of signs being variable) commonly uses the circuit for adding partial products of ±(A×B) by multiplication and the circuit for adding ±C to the result of multiplication, and can therefore reduce the scale of the circuit and increase the speed of calculation.

What is claimed is:

1. A multiplier/adder/subtracter for calculation of Z=±(A×B)±C (the order of signs being variable) for Z, A, B and C as complement data of 2 by using a booth algorithm, comprising:

booth decode execution means for decoding A in the original form or for decoding −A by changing a first control signal depending upon whether A×B or −A×B should be calculated by multiplication;

sign-attached partial product generating means supplied with a result of decoding by said booth decode execution means and B, and for generating partial products on the basis of the result of decoding and B according to the booth algorithm; and sign-attached adder means for adding partial products generated by said sign-attached partial product generating means, and for adding C as a part of addition of said partial products when C is added to a result of multiplication or adding −C as a part of addition of said partial products when C is subtracted from the result of multiplication, wherein said booth decode execution means includes:
a first sign-attached inverter circuit supplied with A and said first control signal, and responsive to said first control signal to output A in the original form when A×B should be executed by multiplication or to output −A when −A×B should be executed by multiplication; and
a booth decoder circuit supplied with an output from said first sign-attached inverter circuit to decode A or −A input from said first sign-attached inverter circuit according to the booth algorithm and to deliver the result of decoding to said sign-attached partial product generating means.

2. The multiplier/adder/subtracter according to claim 1 wherein said sign-attached adder means includes a bit inverter circuit supplied with C and a second control signal, said second control signal being changed depending on whether C should be added to or subtracted from the result of multiplication so as to make said bit inverter circuit to selectively output C in the original form or in a bit-inverted form and to make said sign-attached adder circuit to selectively add C in the original form or in a bit-inverted form.

3. The multiplier/adder/subtracter according to claim 2 wherein said sign-attached adder means further includes a final adder circuit supplied with said second control signal, said second control signal being changed depending on whether C should be added to or subtracted from the result of multiplication so as to make said final adder circuit selectively add 1 or not to a least significant bit, said final adder circuit executing final addition of partial products generated by said sign-attached partial product generating means.

4. The multiplier/adder/subtracter according to claim 1 wherein said sign-attached adder means further includes a second sign-attached inverter circuit supplied with C and a second control signal, said second control signal being changed depending on whether C should be added to or subtracted from the result of multiplication so as to make said second sign-attached inverter circuit selectively output C or −C and to make said sign-attached adder means to selectively add C or −C.

5. The multiplier/adder/subtracter according to claim 4 wherein said sign-attached adder means further includes a final adder circuit for executing final addition of partial products generated by said sign-attached partial product generating means.

6. A multiplier/adder/subtracter for calculation of Z=±(A×B)±C (the order of signs being variable) for Z, A, B and C as binary data by using a booth algorithm, comprising:
booth decode execution means for decoding A in the original form or for decoding −A by changing a first control signal depending upon whether A×B or −A×B should be calculated by multiplication;
sign-attached partial product generating means supplied with a result of decoding by said booth decode execution means, and for generating partial products of A×B when multiplication of A×B should be done and for generating partial products of −A×B when multiplication of −A×B should be done; and
sign-attached adder means for executing addition of partial products generated by said sign-attached partial product generating means and for adding C as a part of addition of said partial products when C should be added to the result of multiplication or adding −C as a part of addition of said partial products when C should be subtracted from the result of multiplication.

7. The multiplier/adder/subtracter according to claim 6 wherein C in a bit-inverted form is input to said sign-attached adder means and 1 is added to a least significant bit in a part of the addition when C should be subtracted from the result of multiplication.

8. The multiplier/adder/subtracter according to claim 6 wherein C in a sign-inverted form is input to said sign-attached adder means when C should be subtracted from the result of multiplication.

9. The multiplier/adder/subtracter according to claim 6 wherein each of said binary data Z, A, B and C is expressed by complements of 2.

10. The multiplier/adder/subtracter according to claim 6 wherein said booth decode execution means includes:
sign-attached inverter circuit supplied with A and said first control signal, and responsive to said first control signal to output A in the original form when multiplication A×B should be executed or to output −A when multiplication −A×B should be executed; and
booth decoder circuit supplied with an output from said sign-attached inverter circuit to decode A or −A input from said sign-attached inverter circuit according to the booth algorithm and to deliver a result of decoding to said partial product generating means.

11. A digital signal processor having a multiplier/adder/subtracter for calculation of Z=±(A×B)±C (the order of signs being variable) for Z, A, B and C as complement data of 2 by using a booth algorithm, said multiplier/adder/subtracter comprising:
booth decode execution means for decoding A in the original form or for decoding −A by changing a first control signal depending upon whether A×B or −A×B should be calculated by multiplication;
sign-attached partial product generating means supplied with a result of decoding by said booth decode execution means and B, and for generating partial products on the basis of the result of decoding and B according to the booth algorithm; and
sign-attached adder means for adding partial products generated by said sign-attached partial product generating means, and for adding C as a part of addition of said partial products when C is added to a result of multiplication or adding −C as a part of addition of said partial products when C is subtracted from the result of multiplication,
wherein said booth decode execution means includes:
a first sign-attached inverter circuit supplied with A and said first control signal, and responsive to said first control signal to output A in the original form when A×B should be executed by multiplication or to output −A when −A×B should be executed by multiplication; and
a booth decoder circuit supplied with an output from said first sign-attached inverter circuit to decode A or −A input from said first sign-attached inverter circuit according to the booth algorithm and to deliver the result of decoding to said sign-attached partial product generating means.

12. The digital signal processor according to claim 11 wherein said sign-attached adder means in said multiplier/adder/subtracter includes a bit inverter circuit supplied with C and a second control signal, said second control signal being changed depending on whether C should be added to or subtracted from the result of multiplication so as to make said bit inverter circuit to selectively output C in the original form or in a bit-inverted form and make said sign-attached adder circuit to selectively add C in the original form or in a bit-inverted form.

13. The digital signal processor according to claim 12 wherein said sign-attached adder means in said multiplier/adder/subtracter further includes a final adder circuit supplied with said second control signal, said second control signal being changed depending on whether C should be added to or subtracted from the result of multiplication so as to make said final adder circuit to selectively add 1 or not to a least significant bit, said final adder circuit executing final addition of partial products generated by said sign-attached partial product generating means.

14. The digital signal process according to claim 11 wherein said sign-attached adder means in said multiplier/adder/subtracter further includes a second sign-attached inverter circuit supplied with C and said second control signal, said second control signal being changed depending on whether C should be added to or subtracted from the result of multiplication so as to make said second sign-attached inverter circuit selectively output C or −C and to make said sign-attached adder means to selectively add C or −C.

15. The digital signal processor according to claim 14 wherein said sign-attached adder means in said multiplier/adder/subtracter further includes a final adder circuit for executing final addition of partial products generated by said sign-attached partial product generating means.

16. A multiplier/adder/subtracter for calculation of Z=±(A×B)±C (the order of signs being variable) for Z, A, B and C as complement data of 2 by using a booth algorithm, comprising:

booth decode execution means for decoding A in the original form or for decoding −A by changing a first control signal depending upon whether A×B or −A×B should be calculated by multiplication;

sign-attached partial product generating means supplied with a result of decoding by said booth decode execution means and B, and for generating partial products on the basis of the result of decoding and B according to the booth algorithm; and sign-attached adder means for adding partial products generated by said sign-attached partial product generating means, and for adding C as a part of addition of said partial products when C is added to a result of multiplication or adding −C as a part of addition of said partial products when C is subtracted from the result of multiplication, wherein said sign-attached adder means includes:
      a bit inverter circuit supplied with C and a second control signal, said second control signal being changed depending on whether C should be added to or subtracted from the result of multiplication so as to make said bit inverter circuit to selectively output C in the original form or in a bit-inverted form and to make said sign-attached adder circuit to selectively add C in the original form or in a bit-inverted form; and
      a final adder circuit supplied with said second control signal, said second control signal being changed depending on whether C should be added to or subtracted from the result of multiplication so as to make said final adder circuit to selectively add 1 or not to a least significant bit, said final adder circuit executing final addition of partial products generated by said sign-attached partial product generating means.

17. A digital signal processor having a multiplier/adder/subtracter for calculation of Z=±(A×B)±C (the order of signs being variable) for Z, A, B and C as complement data of 2 by using a booth algorithm, said multiplier/adder/subtracter comprising:

booth decode execution means for decoding A in the original form or for decoding −A by changing a first control signal depending upon whether A×B or −A×B should be calculated by multiplication;

sign-attached partial product generating means supplied with a result of decoding by said booth decode execution means and B, and for generating partial products on the basis of the result of decoding and B according to the booth algorithm; and sign-attached adder means for adding partial products generated by said sign-attached partial product generating means, and for adding C as a part of addition of said partial products when C is added to a result of multiplication or adding −C as a part of addition of said partial products when C is subtracted from the result of multiplication, wherein said sign-attached adder means in said multiplier/adder/subtracter includes:
      a bit inverter circuit supplied with C and a second control signal, said second control signal being changed depending on whether C should be added to or subtracted from the result of multiplication so as to make said bit inverter circuit to selectively output C in the original form or in a bit-inverted form and to make said sign-attached adder circuit to selectively add C in the original form or in a bit-inverted form; and
      a final adder circuit supplied with said second control signal, said second control signal being changed depending on whether C should be added to or subtracted from the result of multiplication so as to make said final adder circuit selectively add 1 or not to a least significant bit, said final adder circuit executing final addition of partial products generated by said sign-attached partial product generating means.

18. A multiplier/adder/subtracter for calculation of Z=±(A×B)±C (the order of signs being variable) for Z, A, B and C as complement data of 2 by using a booth algorithm, comprising:

a booth decoder execution circuit configured to decode A in the original form or to decode −A by changing a first control signal depending upon whether A×B or −A×B should be calculated by multiplication;

a sign-attached partial product generating circuit supplied with a result of decoding by said booth decoder execution circuit and B, and configured to generate partial products on the basis of the result of decoding and B according to the booth algorithm; and a sign-attached adder circuit configured to add partial products generated by said sign-attached partial product generating circuit, and to add C as a part of addition of said partial products when C is added to a result of multiplication or to add −C as a part of addition of said partial products when C is subtracted from the result of multiplication, wherein said booth decoder execution circuit includes:
      a first sign-attached inverter circuit supplied with A and said first control signal, and responsive to said first control signal, said inverter circuit configured to output A in the original form when A×B should be executed by multiplication or to output −A when −A×B should be executed by multiplication; and
      a booth decoder circuit supplied with an output from said first sign-attached inverter circuit and configured to decode A or −A input from said first sign-attached inverter circuit according to the booth algorithm and to deliver the result of decoding to said sign-attached partial product generating circuit.

19. The multiplier/adder/subtracter according to claim 18, wherein said sign-attached adder circuit includes a bit inverter circuit supplied with C and a second control signal, said second control signal being changed depending on whether C should be added to or subtracted from the result of multiplication so as to make said bit inverter circuit to selectively output C in the original form or in a bit-inverted form and to make said sign-attached adder circuit to selectively add C in the original form or in a bit-inverted form.

20. The multiplier/adder/subtracter according to claim 19, wherein said sign-attached adder circuit further includes a final adder circuit supplied with said second control signal, said second control signal being changed depending on whether C should be added to or subtracted from the result of multiplication so as to make said final adder circuit selectively add 1 or not to a least significant bit, said final adder circuit executing final addition of partial products generated by said sign-attached partial product generating circuit.

21. The multiplier/adder/subtracter according to claim 18, wherein said sign-attached adder circuit further includes a second sign-attached inverter circuit supplied with C and a second control signal, said second control signal being changed depending on whether C should be added to or subtracted from the result of multiplication so as to make said second sign-attached inverter circuit selectively output C or −C and to make said sign-attached adder circuit to selectively add C or −C.

22. The multiplier/adder/subtracter according to claim 21, wherein said sign-attached adder circuit further includes a final adder circuit configured to execute final addition of partial products generated by said sign-attached partial product generating circuit.

23. A multiplier/adder/subtracter for calculation of Z=±(A×B)±C (the order of signs being variable) for Z, A, B and C as binary data by using a booth algorithm, comprising:
    a booth decoder execution circuit configured to decode A in the original form or to decode −A by changing a first control signal depending upon whether A×B or −A×B should be calculated by multiplication;
    a sign-attached partial product generating circuit supplied with a result of decoding by said booth decode execution circuit, and configured to generate partial products of A×B when multiplication of A×B should be done and to generate partial products of −A×B when multiplication of −A×B should be done; and
    a sign-attached adder circuit configured to execute addition of partial products generated by said sign-attached partial product generating circuit and to add C as a part of addition of said partial products when C should be added to the result of multiplication or adding −C as a part of addition of said partial products when C should be subtracted from the result of multiplication.

24. The multiplier/adder/subtracter according to claim 23, wherein C in a bit-inverted form is input to said sign-attached adder circuit and 1 is added to a least significant bit in a part of the addition when C should be subtracted from the result of multiplication.

25. The multiplier/adder/subtracter according to claim 23, wherein C in a sign-inverted form is input to said sign-attached adder circuit when C should be subtracted from the result of multiplication.

26. The multiplier/adder/subtracter according to claim 23, wherein each of said binary data Z, A, B and C is expressed by complements of 2.

27. A multiplier/adder/subtracter according to claim 23, wherein said booth decode execution circuit includes:
    a sign-attached inverter circuit supplied with A and said first control signal, and responsive to said first control signal, and configured to output A in the original form when multiplication A×B should be executed or to output −A when multiplication −A×B should be executed; and
    a booth decoder circuit supplied with an output from said sign-attached inverter circuit and configured to decode A or −A input from said sign-attached inverter circuit according to the booth algorithm and to deliver a result of decoding to said partial product generating circuit.

28. A digital signal processor having a multiplier/adder/subtracter for calculation of Z=±(A×B)±C (the order of signs being variable) for Z, A, B and C as complement data of 2 by using a booth algorithm, said multiplier/adder/subtracter comprising:
    a booth decode execution circuit configured to decode A in the original form or to decode −A by changing a first control signal depending upon whether A×B or −A×B should be calculated by multiplication;
    a sign-attached partial product generating circuit supplied with a result of decoding by said booth decode execution circuit and B, and configured to generate partial products on the basis of the result of decoding and B according to the booth algorithm; and
    a sign-attached adder circuit configured to add partial products generated by said sign-attached partial product generating circuit, and to add C as a part of addition of said partial products when C is added to a result of multiplication or to add −C as a part of addition of said partial products when C is subtracted from the result of multiplication,
    wherein said booth decode execution circuit includes:
        a first sign-attached inverter circuit supplied with A and said first control signal, and responsive to said first control signal and configured to output A in the original form when A×B should be executed by multiplication or to output −A when −A×B should be executed by multiplication, and
        a booth decoder circuit supplied with an output from said first sign-attached inverter circuit and configured to decode A or −A input from said first sign-attached inverter circuit according to the booth algorithm and to deliver the result of decoding to said sign-attached partial product generating circuit.

29. The digital signal processor according to claim 28, wherein said sign-attached adder circuit in said multiplier/adder/subtracter includes a bit inverter circuit supplied with C and a second control signal, said second control signal being changed depending on whether C should be added to or subtracted from the result of multiplication so as to make said bit inverter circuit selectively output C in the original form or in a bit-inverted form and to make said sign-attached adder circuit to selectively add C in the original form or in a bit-inverted form.

30. The digital signal processor according to claim 29, wherein said sign-attached adder circuit in said multiplier/adder/subtracter further includes a final adder circuit supplied with said second control signal, said second control signal being changed depending on whether C should be added to or subtracted from the result of multiplication so as to make said final adder circuit selectively add 1 or not to a least significant bit, said final adder circuit executing final addition of partial products generated by said sign-attached partial product generating circuit.

31. The digital signal processor according to claim 28, wherein said sign-attached adder circuit in said multiplier/adder/subtracter further includes at second sign-attached inverter circuit supplied with C and said second control signal, said second control signal being changed depending on whether C should be added to or subtracted from the result of multiplication so as to make said second sign-attached inverter circuit selectively output C or −C and to make said sign-attached adder circuit to selectively add C or −C.

32. The digital signal processor according to claim 31, wherein said sign-attached adder circuit in said multiplier/adder/subtracter further includes a final adder circuit configured to execute final addition of partial products generated by said sign-attached partial product generating circuit.

33. A multiplier/adder/subtracter for calculation of Z=±(A×B)±C (the order of signs being variable) for Z, A, B and C as complement data of 2 by using a booth algorithm, comprising:

a booth decode execution circuit configured to decode A in the original form or to decode −A by changing a first control signal depending upon whether A×B or −A×B should be calculated by multiplication;

a sign-attached partial product generating circuit supplied with a result of decoding by said booth decode execution circuit and B, and configured to generate partial products on the basis of the result of decoding and B according to the booth algorithm; and a sign-attached adder circuit configured to add partial products generated by said sign-attached partial product generating circuit, and to add C as a part of addition of said partial products when C is added to a result of multiplication or adding −C as a part of addition of said partial products when C is subtracted from the result of multiplication, wherein said sign-attached adder circuit includes:

a bit inverter circuit supplied with C and a second control signal, said second control signal being changed depending on whether C should be added to or subtracted from the result of multiplication so as to make said bit inverter circuit selectively output C in the original form or in a bit-inverted form and to make said sign-attached adder circuit to selectively add C in the original form or in a bit-inverted form; and a final adder circuit supplied with said second control signal, said second control signal being changed depending on whether C should be added to or subtracted from the result of multiplication so as to make said final adder circuit selectively add 1 or not to a least significant bit, said final adder circuit executing final addition of partial products generated by said sign-attached partial product generating circuit.

34. A digital signal processor having a multiplier/adder/subtracter for calculation of Z=±(A×B)±C (the order of signs being variable) for Z, A, B and C as complement data of 2 by using a booth algorithm, said multiplier/adder/subtracter comprising:

a booth decode execution circuit configured to decode A in the original form or to decode −A by changing a first control signal depending upon whether A×B or −A×B should be calculated by multiplication;

a sign-attached partial product generating circuit supplied with a result of decoding by said booth decode execution circuit and B, and to generate partial products on the basis of the result of decoding and B according to the booth algorithm; and a sign-attached adder circuit configured to add partial products generated by said sign-attached partial product generating circuit, and to add C as a part of addition of said partial products when C is added to a result of multiplication or to add −C as a part of addition of said partial products when C is subtracted from the result of multiplication, wherein said sign-attached adder circuit in said multiplier/adder/subtracter includes:

a bit inverter circuit supplied with C and a second control signal, said second control signal being changed depending on whether C should be added to or subtracted from the result of multiplication so as to make said bit inverter circuit selectively output C in the original form or in a bit-inverted form and to make said sign-attached adder circuit selectively add C in the original form or in a bit-inverted form; and a final adder circuit supplied with said second control signal, said second control signal being changed depending on whether C should be added to or subtracted from the result of multiplication so as to make said final adder circuit selectively add 1 or not to a least significant bit, said final adder circuit executing final addition of partial products generated by said sign-attached partial product generating circuit.

\* \* \* \* \*